United States Patent
Liu et al.

(10) Patent No.: US 12,075,413 B2
(45) Date of Patent: Aug. 27, 2024

(54) DATA TRANSMISSION METHOD AND APPARATUS

(71) Applicant: HUAWEI TECHNOLOGIES CO., LTD., Guangdong (CN)

(72) Inventors: Jing Liu, Shanghai (CN); Zhenzhen Cao, Beijing (CN); Mingzeng Dai, Shenzhen (CN); Yuanping Zhu, Shanghai (CN); Yibin Zhuo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 30 days.

(21) Appl. No.: 17/401,986

(22) Filed: Aug. 13, 2021

(65) Prior Publication Data
US 2021/0377930 A1    Dec. 2, 2021

Related U.S. Application Data

(63) Continuation of application No. PCT/CN2020/075307, filed on Feb. 14, 2020.

(30) Foreign Application Priority Data

Feb. 15, 2019 (CN) .......................... 201910118359.1

(51) Int. Cl.
*H04W 72/00* (2023.01)
*H04W 8/26* (2009.01)
(Continued)

(52) U.S. Cl.
CPC ............. *H04W 72/20* (2023.01); *H04W 8/26* (2013.01); *H04W 28/0268* (2013.01); *H04W 48/12* (2013.01); *H04W 72/1273* (2013.01)

(58) Field of Classification Search
CPC ... H04W 72/20; H04W 8/26; H04W 28/0268; H04W 48/12; H04W 72/1273;
(Continued)

(56) References Cited

U.S. PATENT DOCUMENTS 10,136,359 B2  11/2018 Hampel et al.
10,206,232 B2   2/2019 Novlan et al.
(Continued)

FOREIGN PATENT DOCUMENTS

CN   107736004 A   2/2018
CN   107852363 A   3/2018
WO   2019032885 A1  2/2019

OTHER PUBLICATIONS

Nokia. (Adaptation layer contents and configuration, R2-1900626, Mar. 2019).*

(Continued)

*Primary Examiner* — Lakeram Jangbahadur
(74) *Attorney, Agent, or Firm* — Fish & Richardson P.C.

(57) ABSTRACT

This application provides a data transmission method and an apparatus. The method includes that an integrated access and backhaul (IAB) donor distributed unit receives downlink data and service attribute information of downlink data that are sent by an IAB donor centralized unit. The IAB donor distributed unit maps the downlink data to a corresponding backhaul radio link control channel (BH RLC) channel based on the service attribute information of the downlink data or based on the service attribute information of the downlink data and access IAB node address information of the downlink data, and sends the downlink data to a next-hop IAB node.

17 Claims, 12 Drawing Sheets

(51) Int. Cl.
    *H04W 28/02*    (2009.01)
    *H04W 48/12*    (2009.01)
    *H04W 72/1273*  (2023.01)
    *H04W 72/20*    (2023.01)

(58) Field of Classification Search
    CPC ... H04W 40/22; H04W 76/11; H04W 88/085; H04W 40/02; H04W 76/12; H04L 67/61; H04L 69/22
    See application file for complete search history.

(56) References Cited

U.S. PATENT DOCUMENTS

| | | | |
|---|---|---|---|
| 2017/0006499 | A1 | 1/2017 | Hampel et al. |
| 2018/0092139 | A1 | 3/2018 | Novlan et al. |
| 2019/0053317 | A1* | 2/2019 | Hampel ............... H04W 28/085 |
| 2020/0146109 | A1* | 5/2020 | Majmundar .......... H04W 92/14 |

OTHER PUBLICATIONS

Ericsson (QOS Mapping to Backhaul Bearers in IAB Networks, R2-1901323, Mar. 2019).*

3GPP TR 38.874 1.0.0 (Dec. 2018), "3rd Generation Partnership Project; Technical Specification Group Radio Access Network; Study on Integrated Access and Backhaul;(Release 15)," Dec. 2018, 111 pages.

PCT International Search Report and Written Opinion issued in International Application No. PCT/CN2020/075307 on May 12, 2020, 13 pages (with English translation).

Office Action issued in Indian Application No. 202117039239 on Mar. 25, 2022, 6 pages.

Ericsson, "QoS Mapping to Backhaul Bearers in IAB Networks," 3GPP TSG RAN WG2 Meeting #105, Athens, Greece, Feb. 25-Mar. 1, 2019, R2-1901323, 3 pages.

Extended European Search Report issued in European Application No. 20756465.9 on Apr. 4, 2022, 14 pages.

Nokia, Nokia Shanghai Bell, "Adaptation layer contents and configuration," 3GPP TSG-RAN WG2 Meeting #105, R2-1900626, Athens, Greece, Feb. 25-Mar. 1, 2019, 10 pages.

Huawei et al., "QoS Management of IAB nodes," 3GPP TSG-RAN WG2#103, R2-1812786, Gothenburg, Sweden, Aug. 20-24, 2018, 8 pages.

* cited by examiner

DATA TRANSMISSION METHOD AND APPARATUS

CROSS-REFERENCE TO RELATED APPLICATIONS

This application is a continuation of International Application No. PCT/CN2020/075307, filed on Feb. 14, 2020, which claims priority to Chinese Patent Application No. 201910118359.1, filed on Feb. 15, 2019. The disclosures of the aforementioned applications are hereby incorporated by reference in their entireties.

TECHNICAL FIELD

This application relates to wireless communication technologies, and in particular, to a data transmission method and an apparatus.

BACKGROUND

In a 5th generation (5G) communication technology, to cope with an explosive growth of mobile data traffic and massive device connections in the future, and meet various emerging new services and application scenarios, a base station (gNB) may use a control plane-user plane (CU-DU) split architecture. To be specific, one gNB may include one CU and one or more DUs. The CU and the DU are connected to each other through an F1 interface, and the CU and a core network 5GC are connected to each other through an NG interface. UE accesses the CU through the DU, a peer PHY/MAC/RLC layer of the UE is located on the DU, and a peer PDCP/RRC layer of the UE is located on the CU.

For an integrated access and backhaul (IAB) system that is based on the foregoing architecture, a protocol stack architecture of a user plane in the IAB system is mainly discussed currently, but no solution is provided for how to perform user plane data transmission in the IAB system.

SUMMARY

This application provides a data transmission method and an apparatus, to implement user plane data transmission in an IAB system.

According to a first aspect, this application provides a data transmission method. The method may be used for an IAB donor (donor) distributed unit (DU) in an IAB system. The method may include: The IAB donor DU receives downlink data and service attribute information of the downlink data that are sent by an IAB donor centralized unit (CU). The IAB donor DU maps the downlink data to a corresponding backhaul radio link control (BH RLC) channel based on the service attribute information of the downlink data or based on the service attribute information of the downlink data and access IAB node address information of the downlink data, and sends the downlink data to a next-hop IAB node (node).

In this application, the IAB donor DU maps, to the corresponding BH RLC channel, the downlink data sent by the IAB donor CU, and sends the downlink data to the next-hop IAB node, so that the IAB node may further map the downlink data to a corresponding BH RLC channel, and/or a corresponding data radio bearer or logical channel that is on an air interface, to implement user plane data transmission in an IAB system.

Based on the first aspect, in some possible implementations, the method further includes: The IAB donor distributed unit receives the service attribute information and a BH RLC channel identity that are sent by the IAB donor centralized unit, where the service attribute information corresponds to the BH RLC channel identity; or the IAB donor distributed unit receives the service attribute information, the access IAB node address information, and a BH RLC channel identity that are sent by the IAB donor centralized unit, where the service attribute information and the access IAB node address information correspond to the BH RLC channel identity. That the IAB donor distributed unit maps the downlink data to a corresponding BH RLC channel based on the service attribute information of the downlink data or based on the service attribute information of the downlink data and access IAB node address information of the downlink data, and sends the downlink data to a next-hop IAB node includes: The IAB donor distributed unit determines, based on a correspondence between the service attribute information and the BH RLC channel identity, a first BH RLC channel identity corresponding to the service attribute information of the downlink data, maps the downlink data to a BH RLC channel corresponding to the first BH RLC channel identity, and sends the downlink data to the next-hop IAB node; or the IAB donor distributed unit determines, based on a correspondence between the BH RLC channel identity, and the service attribute information and the access IAB node address information, a first BH RLC channel identity corresponding to the service attribute information of the downlink data and the access IAB node address information of the downlink data, maps the downlink data to a BH RLC channel corresponding to the first BH RLC channel identity, and sends the downlink data to the next-hop IAB node.

Based on the first aspect, in some possible implementations, the method further includes: The IAB donor distributed unit sends a logical channel identity corresponding to the BH RLC channel to the IAB donor centralized unit, where the logical channel identity is used to indicate the IAB donor centralized unit to determine a logical channel allocated by the IAB donor distributed unit to the BH RLC channel.

Based on the first aspect, in some possible implementations, the method further includes: The IAB donor distributed unit receives the service attribute information and service quality of service QoS information that are sent by the IAB donor centralized unit, where the service attribute information corresponds to the service QoS information; or the IAB donor distributed unit receives the service attribute information, the access IAB node address information, and service quality of service QoS information that are sent by the IAB donor centralized unit, where the service attribute information and the access IAB node address information correspond to the service QoS information. That the IAB donor distributed unit maps the downlink data to a corresponding BH RLC channel based on the service attribute information of the downlink data or based on the service attribute information of the downlink data and access IAB node address information of the downlink data, and sends the downlink data to a next-hop IAB node includes: The IAB donor distributed unit determines, based on a correspondence between the service attribute information and the service QoS information, first service QoS information corresponding to the service attribute information of the downlink data, maps the downlink data to a BH RLC channel corresponding to the first service QoS information, and sends the downlink data to the next-hop IAB node; or the IAB donor distributed unit determines, based on a correspondence between the service QoS information, and the service attribute information and the access IAB node address information, first service QoS information corresponding to the service attribute information of the downlink data and the access IAB node address information of the downlink data, maps the downlink data to a BH RLC channel corresponding to the first service QoS information, and sends the downlink data to the next-hop IAB node.

Based on the first aspect, in some possible implementations, the method further includes: The IAB donor distributed unit sends, to the next-hop IAB node, a service bearer identity, the service attribute information, or the service attribute information and the access IAB node address information that are of the downlink data and that are carried in an adaptation layer.

Based on the first aspect, in some possible implementations, the method further includes: The IAB donor distributed unit receives the service attribute information and the service bearer identity that are sent by the IAB donor centralized unit, where the service attribute information corresponds to the service bearer identity; or the IAB donor distributed unit receives the service attribute information, the access IAB node address information, and the service bearer identity that are sent by the IAB donor centralized unit, where the service attribute information and the access IAB node address information correspond to the service bearer identity. That the IAB donor distributed unit maps the downlink data to a corresponding BH RLC channel based on the service attribute information of the downlink data or based on the service attribute information of the downlink data and access IAB node address information of the downlink data, and sends the downlink data to a next-hop IAB node includes: The IAB donor distributed unit determines, based on a correspondence between the service attribute information and the service bearer identity, a first service bearer identity corresponding to the service attribute information of the downlink data, and sends the first service bearer identity carried in the adaptation layer to the next-hop IAB node; or the IAB donor distributed unit determines, based on a correspondence between the service bearer identity, and the service attribute information and the access IAB node address information, a first service bearer identity corresponding to the service attribute information of the downlink data and the access IAB node address information of the downlink data, and sends the first service bearer identity carried in the adaptation layer to the next-hop IAB node.

Based on the first aspect, in some possible implementations, the IAB node includes an IAB node distributed unit and an IAB node mobile terminal unit; and the method further includes: The IAB donor distributed unit receives a service bearer identity of uplink data, or service attribute information of uplink data, or service attribute information of uplink data and access IAB node address information of the uplink data sent by a previous-hop IAB node mobile terminal unit, where the service bearer identity of the uplink data, or the service attribute information of the uplink data, or the service attribute information of the uplink data and the access IAB node address information of the uplink data are sent while being carried in the adaptation layer.

Based on the first aspect, in some possible implementations, the method further includes: The IAB donor distributed unit receives indication information sent by the IAB donor centralized unit, where the indication information is used to indicate the IAB donor distributed unit to enable an F1 application protocol F1AP proxy function; and
the IAB donor distributed unit allocates, in response to the indication information, corresponding uplink F1 transport network layer UL F1 TNL information to a service bearer, and sends the UL F1 TNL information to the IAB donor centralized unit.

Based on the first aspect, in some possible implementations, the method further includes: The IAB donor distributed unit receives downlink F1 transport network layer DL F1 TNL information sent by the IAB donor centralized unit, where the DL F1 TNL information is allocated by an access IAB node to the service bearer.

Based on the first aspect, in some possible implementations, the service attribute information of the downlink data is one of the following information: a differentiated services code point DSCP of the downlink data or a flow label of the downlink data; and the service attribute information of the downlink data is encapsulated in an IP layer header field.

According to a second aspect, this application provides a data transmission method, and the method may be used for an IAB node in an IAB system. The method may include: An IAB node obtains downlink data and at least one of the following information of the downlink data: a backhaul radio link control BH RLC channel identity, a service bearer identity, service attribute information, or service attribute information and access IAB node address information, where the service bearer identity of the downlink data, the service attribute information of the downlink data, and the service attribute information of the downlink data and the access IAB node address information of the downlink data are received from an adaptation layer; and the IAB node maps, based on the at least one of the information, the downlink data to a corresponding BH RLC channel, and sends the downlink data.

Based on the second aspect, in some possible implementations, the method further includes: The IAB node receives a BH RLC channel identity of a previous-hop backhaul link and a BH RLC channel identity of a next-hop backhaul link, or a service bearer identity and a BH RLC channel identity, or service attribute information and a BH RLC channel identity, or service attribute information, access IAB node address information, and a BH RLC channel identity that are sent by an IAB donor centralized unit, where the BH RLC channel identity of the previous-hop backhaul link corresponds to the BH RLC channel identity of the next-hop backhaul link, the service bearer identity corresponds to the BH RLC channel identity, the service attribute information corresponds to the BH RLC channel identity, and the service attribute information and the access IAB node address information correspond to the BH RLC channel identity; and That the IAB node maps, based on the at least one of the information, the downlink data to a corresponding BH RLC channel, and sending the downlink data includes: The IAB node determines, based on a correspondence between the BH RLC channel identity of the previous-hop backhaul link and the BH RLC channel identity of the next-hop backhaul link, or a correspondence between the service bearer identity and the BH RLC channel identity, or a correspondence between the service attribute information and the BH RLC channel identity, or a correspondence between the BH RLC channel identity, and the service attribute information and the access IAB node address information, a second BH RLC channel identity corresponding to the at least one of the information of the downlink data, maps the downlink data to a BH RLC channel corresponding to the second BH RLC channel identity, and sends the downlink data to a next-hop IAB node.

Based on the second aspect, in some possible implementations, the method further includes: The IAB node receives the service bearer identity and service quality of service QoS information, or the service attribute information and service QoS information, or the service attribute information, the access IAB node address information, and service QoS information, or the BH RLC channel identity and service QoS information that are sent by the IAB donor centralized unit, where the service bearer identity corresponds to the service QoS information, the service attribute information corresponds to the service QoS information, the service attribute information and the access IAB node address information correspond to the service QoS information, and the BH RLC channel identity corresponds to the service QoS information. That the IAB node maps, based on the at least one of the information, the downlink data to a corresponding BH RLC channel, and sending the downlink data includes: The IAB node determines, based on a correspondence between the service bearer identity and the service QoS information, or a correspondence between the service attribute information and the service QoS information, or a correspondence between the service QoS information, and the service attribute information and the access IAB node address information, or a correspondence between the BH RLC channel identity and the service QoS information, second service QoS information corresponding to the at least one of the information of the downlink data, maps the downlink data to a BH RLC channel corresponding to the second service QoS information, and sends the downlink data to the next-hop IAB node.

Based on the second aspect, in some possible implementations, the method further includes: The IAB node receives the BH RLC channel identity and a data radio bearer identity or a logical channel identity that is on an air interface, or the service bearer identity and a data radio bearer identity or a logical channel identity that is on an air interface, or the service attribute information and a data radio bearer identity or a logical channel identity that is on an air interface, or the service attribute information, the access IAB node address information, and a data radio bearer identity or a logical channel identity that is on an air interface that are sent by the IAB donor centralized unit, where the BH RLC channel identity corresponds to the data radio bearer identity or the logical channel identity that is on the air interface, the service bearer identity corresponds to the data radio bearer identity or the logical channel identity that is on the air interface, the service attribute information corresponds to the data radio bearer identity or the logical channel identity that is on the air interface, and the service attribute information and the access IAB node address information correspond to the data radio bearer identity or the logical channel identity that is on the air interface. That the IAB node maps, based on the at least one of the information, the downlink data to a corresponding BH RLC channel, and sending the downlink data includes: The IAB node determines, based on a correspondence between the BH RLC channel identity and the data radio bearer identity or the logical channel identity, or a correspondence between the service bearer identity and the data radio bearer identity or the logical channel identity, or a correspondence between the service attribute information and the data radio bearer identity or the logical channel identity, or a correspondence between the data radio bearer identity or the logical channel identity, and the service attribute information and the access IAB node address information, a first data radio bearer identity or a first logical channel identity on the air interface corresponding to the at least one of the information of the downlink data, maps the downlink data to a radio bearer corresponding to the first data radio bearer identity or a logical channel corresponding to the first logical channel identity, and sends the downlink data to a terminal.

Based on the second aspect, in some possible implementations, the IAB node includes an IAB node distributed unit and an IAB node mobile terminal unit; and the method further includes: The IAB node mobile terminal unit sends a service bearer identity of uplink data, or service attribute information of uplink data, or service attribute information of uplink data and access IAB node address information of the uplink data to the IAB node distributed unit on a next-hop intermediate backhaul link.

Based on the second aspect, in some possible implementations, the method further includes: The IAB node maps the uplink data to a BH RLC channel on which the downlink data is received, and sends the uplink data, where the uplink data and the downlink data have same service QoS information.

Based on the second aspect, in some possible implementations, the method further includes: The IAB node allocates downlink F1 transport network layer DL F1 TNL information to a service bearer, and sends the DL F1 TNL information to the IAB donor centralized unit.

According to a third aspect, this application provides a communication apparatus. The communication apparatus may be a data transmission apparatus, or a chip or a system on chip in a data transmission apparatus, or may be a functional module that is in a data transmission apparatus and that is configured to implement the method according to any one of the first aspect or the possible implementations of the first aspect. The communication apparatus may implement a function performed by the IAB donor DU in the foregoing aspects or possible implementations, and the function may be implemented by hardware executing corresponding software. The hardware or the software includes one or more modules corresponding to the foregoing functions. For example, the communication apparatus may include: a first receiving unit, configured to receive downlink data and service attribute information of the downlink data that are sent by an IAB donor centralized unit; and a first sending unit, configured to: map the downlink data to a corresponding backhaul radio link control BH RLC channel based on the service attribute information of the downlink data or based on the service attribute information of the downlink data and access IAB node address information of the downlink data, and send the downlink data to a next-hop IAB node.

Based on the third aspect, in some possible implementations, the apparatus further includes: a second receiving unit, configured to receive the service attribute information and a BH RLC channel identity that are sent by the IAB donor centralized unit, where the service attribute information corresponds to the BH RLC channel identity. The first sending unit includes a determining subunit and a sending subunit, where the determining subunit is configured to determine, based on the service attribute information and the BH RLC channel identity, a first BH RLC channel identity corresponding to the service attribute information of the downlink data; and the sending subunit is configured to: map the downlink data to a BH RLC channel corresponding to the first BH RLC channel identity, and send the downlink data to the next-hop IAB node.

Based on the third aspect, in some possible implementations, the apparatus further includes: a second sending unit, configured to send a BH RLC channel identity and a logical channel identity to the IAB donor centralized unit, where the BH RLC channel identity corresponds to the logical channel identity, and the BH RLC channel identity and the logical channel identity are used to indicate the IAB donor centralized unit to determine a logical channel allocated by an IAB donor distributed unit to the BH RLC channel.

Based on the third aspect, in some possible implementations, the apparatus further includes: a second receiving unit, configured to receive the service attribute information and service quality of service QoS information that are sent by the IAB donor centralized unit, where the service attribute information corresponds to the service quality of service QoS information. The first sending unit includes a determining subunit and a sending subunit, where the determining subunit is configured to determine, based on the service attribute information and the service QoS information, first service QoS information corresponding to the service attribute information of the downlink data; and the sending subunit is configured to: map the downlink data to a BH RLC channel corresponding to the first service QoS information, and send the downlink data to the next-hop IAB node.

Based on the third aspect, in some possible implementations, the apparatus further includes: a third sending unit, configured to send, to the next-hop IAB node, a service bearer identity or the service attribute information that is of the downlink data and that is carried in an adaptation layer.

Based on the third aspect, in some possible implementations, the apparatus further includes: a second receiving unit, configured to receive the service attribute information and the service bearer identity that are sent by the IAB donor centralized unit, where the service attribute information corresponds to the service bearer identity. The third sending unit includes a determining subunit and a sending subunit, where the determining subunit is configured to determine, based on the service attribute information and the service bearer identity, a first service bearer identity corresponding to the service attribute information of the downlink data; and the sending subunit is configured to send the first service bearer identity carried in the adaptation layer to the next-hop IAB node.

Based on the third aspect, in some possible implementations, the IAB node includes an IAB node distributed unit and an IAB node mobile terminal unit; and the apparatus further includes: a third receiving unit, configured to receive a service bearer identity of uplink data or service attribute information of uplink data sent by a next-hop IAB node mobile terminal unit, where the service bearer identity of the uplink data or the service attribute information of the uplink data is sent while being carried in the adaptation layer.

Based on the third aspect, in some possible implementations, the apparatus further includes: a fourth receiving unit, a first allocation unit, and a fourth sending unit, where the fourth receiving unit is configured to receive indication information sent by the IAB donor centralized unit, where the indication information is used to indicate the IAB donor distributed unit to enable an F1 application protocol F1AP proxy function; the first allocation unit is configured to: in response to the indication information, allocate corresponding uplink F1 transport network layer UL F1 TNL information to a service bearer; and the fourth sending unit is configured to send the UL F1 TNL information to the IAB donor centralized unit.

Based on the third aspect, in some possible implementations, the apparatus further includes: a fifth receiving unit, configured to receive downlink F1 transport network layer DL F1 TNL information sent by the IAB donor centralized unit, where the DL F1 TNL information is allocated by an access IAB node to the service bearer.

Based on the third aspect, in some possible implementations, the service attribute information of the downlink data is one of the following information: a differentiated services code point DSCP of the downlink data or a flow label of the downlink data; the DSCP of the downlink data and the access IAB node address information of the downlink data; and the flow label and the access IAB node address information; and the service attribute information of the downlink data is encapsulated in an IP layer header field.

The first receiving unit to the fifth receiving unit mentioned in the third aspect may each be a receiving interface, a receiving circuit, a receiver, or the like. The sending subunit in the first sending unit, and the second sending unit to the fourth sending unit may each be a sending interface, a sending circuit, a transmitter, or the like. The determining subunit in the first sending unit, and the first allocation unit may each be one or more processors.

According to a fourth aspect, this application provides a communication apparatus. The communication apparatus may be a data transmission apparatus, or a chip or a system on chip in a data transmission apparatus, or may be a functional module that is in a data transmission apparatus and that is configured to implement the method according to any one of the second aspect or the possible implementations of the second aspect. The communication apparatus may implement a function performed by the IAB node in the foregoing aspects or possible implementations, and the function may be implemented by hardware executing corresponding software. The hardware or the software includes one or more modules corresponding to the foregoing functions. For example, the communication apparatus may include: a sixth receiving unit 901, configured to receive downlink data and at least one of the following information of the downlink data: a backhaul radio link control BH RLC channel identity, a service bearer identity, service attribute information, or service attribute information and access IAB node address information, where the service bearer identity of the downlink data, the service attribute information of the downlink data, and the service attribute information of the downlink data and the access IAB node address information of the downlink data are received from an adaptation layer; and a fifth sending unit 902, configured to: map, based on the at least one of the information, the downlink data to a corresponding BH RLC channel, and send the downlink data.

Based on the fourth aspect, in some possible implementations, the apparatus further includes: a seventh receiving unit, configured to receive a BH RLC channel identity of a previous-hop backhaul link and a BH RLC channel identity of a next-hop backhaul link, a service bearer identity and a BH RLC channel identity, and/or service attribute information and the BH RLC channel identity that are sent by an IAB donor centralized unit, where the BH RLC channel identity of the previous-hop backhaul link corresponds to the BH RLC channel identity of the next-hop backhaul link, the service bearer identity corresponds to the BH RLC channel identity, and the service attribute information corresponds to the BH RLC channel identity. The fifth sending unit includes a determining subunit and a sending subunit, where the determining subunit is configured to determine, based on the BH RLC channel identity of the previous-hop backhaul link and the BH RLC channel identity of the next-hop backhaul link, the service bearer identity and the BH RLC channel identity, and/or the service attribute information and the BH RLC channel identity, a second BH RLC channel identity corresponding to the at least one of the information of the downlink data; and the sending subunit is configured to: map the downlink data to a BH RLC channel corresponding to the second BH RLC channel identity, and send the downlink data to a next-hop IAB node.

Based on the fourth aspect, in some possible implementations, the apparatus further includes: a seventh receiving unit, configured to receive the service bearer identity and service quality of service QoS information, the service attribute information and the service QoS information, and/or the BH RLC channel identity and the service QoS information that are sent by the IAB donor centralized unit, where the service bearer identity corresponds to the service QoS information, the service attribute information corresponds to the service QoS information, and the BH RLC channel identity corresponds to the service QoS information. The fifth sending unit includes a determining subunit and a sending subunit, where the determining subunit is configured to determine, based on the service bearer identity and the service QoS information, the service attribute information and the service QoS information, and/or the BH RLC channel identity and the service QoS information, second service QoS information corresponding to the at least one of the information of the downlink data; and the sending subunit is configured to: map the downlink data to a BH RLC channel corresponding to the second service QoS information, and send the downlink data to the next-hop IAB node.

Based on the fourth aspect, in some possible implementations, the apparatus further includes: a seventh receiving unit, configured to receive the BH RLC channel identity and a data radio bearer identity or a logical channel identity that is on an air interface, the service bearer identity and the data radio bearer identity or the logical channel identity that is on the air interface, and/or the service attribute information and the data radio bearer identity or the logical channel identity that is on the air interface that are sent by the IAB donor centralized unit, where the BH RLC channel identity corresponds to the data radio bearer identity or the logical channel identity that is on the air interface, the service bearer identity corresponds to the data radio bearer identity or the logical channel identity that is on the air interface, and the service attribute information corresponds to the data radio bearer identity or the logical channel identity that is on the air interface. The fifth sending unit includes a determining subunit and a sending subunit, where the determining subunit is configured to determine, based on the BH RLC channel identity and the data radio bearer identity or the logical channel identity, the service bearer identity and the data radio bearer identity or the logical channel identity, and/or the service attribute information and the data radio bearer identity or the logical channel identity, a first data radio bearer identity or a first logical channel identity on the air interface corresponding to the at least one of the information of the downlink data; and the sending subunit is configured to: map the downlink data to a radio bearer corresponding to the first data radio bearer identity or a logical channel corresponding to the first logical channel identity, and send the downlink data to a terminal.

Based on the fourth aspect, in some possible implementations, the apparatus further includes: a sixth sending unit, configured to send a service bearer identity of uplink data or service attribute information of uplink data to an IAB node distributed unit on a next-hop intermediate backhaul link.

Based on the fourth aspect, in some possible implementations, the apparatus further includes: a seventh sending unit, configured to: map the uplink data to a BH RLC channel on which the downlink data is received, and send the uplink data, where the uplink data and the downlink data have same service QoS information.

Based on the fourth aspect, in some possible implementations, the apparatus further includes a second allocation unit and an eighth sending unit, where the second allocation unit is configured to allocate downlink F1 transport network layer DL F1 TNL information to a service bearer; and the eighth sending unit is configured to send the DL F1 TNL information to the IAB donor centralized unit.

The sixth receiving unit and the seventh receiving unit mentioned in the fourth aspect may each be a receiving interface, a receiving circuit, a receiver, or the like. The sending subunit in the fifth sending unit, and the sixth sending unit to the eighth sending unit may each be a sending interface, a sending circuit, a transmitter, or the like. The determining subunit in the fifth sending unit, and the second allocation unit may each be one or more processors.

According to a fifth aspect, this application provides a communication apparatus. The communication apparatus may be a chip or a system on chip in an IAB donor DU. The communication apparatus may implement a function performed by the IAB donor DU in the foregoing aspects or possible implementations. The function may be implemented by hardware. For example, in a possible implementation, the communication apparatus may include a processor and a communication interface. The processor may be configured to support the communication apparatus in implementing a function in any one of the first aspect or the possible implementations of the first aspect. For example, the processor may receive, through the communication interface, downlink data and service attribute information of the downlink data that are sent by the IAB donor CU. The processor is further configured to: map the downlink data to a corresponding BH RLC channel based on the service attribute information of the downlink data, and send the downlink data to a next-hop IAB node. In another possible implementation, the communication apparatus may further include a memory. The memory is configured to store computer-executable instructions and data that are necessary for the communication apparatus. When the communication apparatus runs, the processor executes the computer-executable instructions stored in the memory, so that the communication apparatus performs the data transmission method according to any one of the first aspect or the possible implementations of the first aspect.

According to a sixth aspect, this application provides a communication apparatus. The communication apparatus may be a chip or a system on chip in an IAB node. The communication apparatus may implement a function performed by the IAB node in the foregoing aspects or possible implementations. The function may be implemented by hardware. For example, in a possible implementation, the communication apparatus may include a processor and a communication interface. The processor may be configured to support the communication apparatus in implementing a function in any one of the second aspect or the possible implementations of the second aspect. For example, the processor may obtain downlink data and at least one of the following information of the downlink data through the communication interface: a BH RLC channel identity, a service bearer identity, or service attribute information. The processor is further configured to: map the downlink data to a corresponding backhaul radio link control channel BH RLC channel based on the at least one of the information, and send the downlink data. In another possible implementation, the communication apparatus may further include a memory. The memory is configured to store computer-executable instructions and data that are necessary for the communication apparatus. When the communication apparatus runs, the processor executes the computer-executable instructions stored in the memory, so that the communication apparatus performs the data transmission method according to any one of the second aspect or the possible implementations of the second aspect.

According to a seventh aspect, this application provides a computer-readable storage medium. The computer-readable storage medium stores instructions, and when the instructions are run on a computer, the computer is configured to perform any data transmission method in the first aspect to the third aspect.

According to an eighth aspect, this application provides a computer program or a computer program product. When the computer program or the computer program product is executed on a computer, the computer is enabled to implement any data transmission method in the first aspect to the third aspect.

According to a ninth aspect, this application provides a communication system, including an IAB donor DU, an IAB node, and an IAB donor CU, where the IAB donor DU is configured to perform any data transmission method in the first aspect, the IAB node is configured to perform any data transmission method in the second aspect, and the IAB donor CU is configured to perform any data transmission method in the third aspect. Optionally, the communication system may be an IAB system.

It should be understood that technical solutions of the third to the ninth aspects of this application are consistent with technical solutions of the first aspect and the second aspect of this application, and advantageous effects achieved by the aspects and the corresponding feasible implementations are similar. Details are not described again.

DESCRIPTION OF EMBODIMENTS

Figure 1:
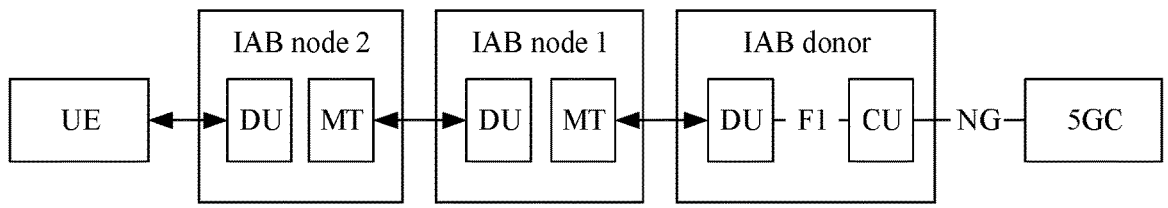
FIG. 1 is a schematic structural diagram of a communication system according to an embodiment of this application.

The following describes the embodiments of this application with reference to the accompanying drawings in the embodiments of this application. In the following descriptions, reference is made to the accompanying drawings that form a part of this application and show, by way of illustration, specific aspects of the embodiments of this application or specific aspects in which the embodiments of this application may be used. It should be understood that the embodiments of this application may be used in other aspects, and may include structural or logical changes not depicted in the accompanying drawings. Therefore, the following detailed descriptions shall not be taken in a limiting sense, and the scope of this application is defined by the appended claims. For example, it should be understood that disclosed content in combination with a described method may also hold true for a corresponding device or system configured to perform the method and vice versa. For example, if one or more specific method steps are described, a corresponding device may include one or more units such as functional units to perform the described one or more method steps (for example, one unit performing the one or more steps, or a plurality of units each performing one or more of the plurality of steps), even if such one or more units are not explicitly described or illustrated in the accompanying drawings. In addition, for example, if a specific apparatus is described based on one or more units such as functional units, a corresponding method may include a step used to perform functionality of the one or more units (for example, one step used to perform the functionality of the one or more units, or a plurality of steps each used to perform functionality of one or more of a plurality of units), even if such one or more steps are not explicitly described or illustrated in the accompanying drawings. Further, it should be understood that features of various example embodiments and/or aspects described in this specification may be combined with each other, unless otherwise specified.

An embodiment of this application provides a communication system. The communication system may be an IAB system. The communication system may include a terminal, an IAB node, and an IAB donor. The IAB node may be classified into an access IAB node and an IAB node that is on an intermediate backhaul link. The access IAB node herein is an IAB node accessed by the terminal, and an interface between the terminal and the IAB node is denoted as a Uu interface (namely, an air interface). The IAB node on the intermediate backhaul link is a relay node located between the access IAB node and the IAB donor, and interfaces between the IAB node on the intermediate backhaul link, and the access IAB node and the IAB donor are denoted as Un interfaces. Names of these interfaces are merely examples, and do not represent a limitation on the interfaces. When a version of the communication system changes, a corresponding name may also be replaced with a name of a corresponding function in another wireless communication network, and both fall within the scope of the claims of this application and an equivalent technology thereof. The terminal may be a device that provides voice or data connectivity for a user, and for example, may also be referred to as user equipment (UE,), a mobile station, a subscriber unit, a station, or terminal equipment (TE). The terminal may be a cellular phone, a personal digital assistant (PDA), a wireless modem, a handheld device, a laptop computer, a cordless phone, a wireless local loop (WLL) station, a tablet (pad), or the like. With development of wireless communication technologies, any device that can access a wireless communication system, communicate with a network side of a wireless communication system, or communicate with another device by using a wireless communication system may be the terminal in the embodiments of this application, such as a terminal and a vehicle in intelligent transportation, a household device in a smart household, an electricity meter reading instrument in a smart grid, a voltage monitoring instrument, an environment monitoring instrument, a video surveillance instrument in an intelligent security network, or a cash register. In the embodiments of this application, the terminal may communicate with a network device, and a plurality of terminals may also communicate with each other. The terminal may be static and fixed or mobile.

A two-hop data backhaul scenario is used as an example. FIG. 1 is a schematic structural diagram of a communication system according to an embodiment of this application. Referring to FIG. 1, the communication system 10 includes a terminal (for example, UE) 11, an IAB node 1, an IAB node 2, and an IAB donor.

The UE accesses the IAB node 2 (namely, an access IAB node), and the IAB donor is connected to a core network (for example, a 5GC) through an NG interface. The IAB donor is a parent node of the IAB node 1, the IAB node 1 is a parent node of the IAB node 2, and the IAB node 2 is a parent node of the UE. The IAB node 1 may be divided into two units: a DU and an MT. The IAB node 2 may be divided into two units: a DU and an MT. The IAB donor may be divided into two units: a DU and a CU. The IAB node 1 DU communicates with the IAB node 1 MT through an internal interface. The IAB node 2 DU communicates with the IAB node 2 MT through an internal interface. The IAB donor DU communicates with the IAB donor CU through an F1 interface. An interface between the UE and the IAB node 2 (specifically, an interface between the UE and the IAB node 2 DU) is denoted as a Uu interface. An interface between the IAB node 2 and the IAB node 1 (specifically, an interface between the IAB node 2 MT and the IAB node 1 DU) is denoted as an Un2 interface. An interface between the IAB node 1 and the IAB donor (specifically, an interface between the IAB node 1 MT and the IAB donor DU) is denoted as an Un1 interface.

In actual application, the IAB system is further used in an N-hop data backhaul scenario, for example, a three-hop data backhaul scenario, a five-hop data backhaul scenario, or an eight-hop data backhaul scenario. Correspondingly, a quantity N of IAB nodes in the IAB system may be an integer greater than or equal to 2, for example, may be 3, 5, or 8. This is not specifically limited in the embodiments of this application.

Figure 2A:
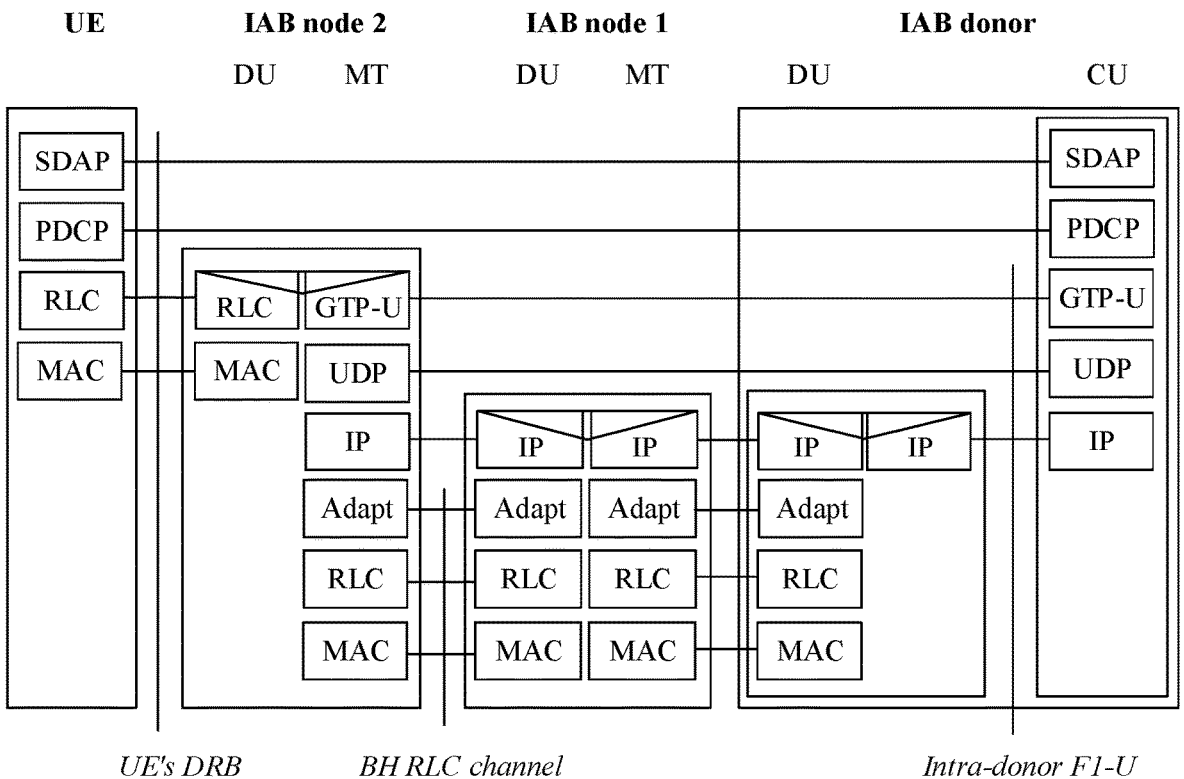
FIG. 2A is a first schematic architectural diagram of a communication system according to an embodiment of this application.

FIG. 2A is a first schematic architectural diagram of a communication system according to an embodiment of this application. In an IAB system having an architecture shown in FIG. 2A, per UE per bearer tunnel is established between an IAB node 2 and an IAB donor CU (to be specific, one corresponding general packet radio service tunneling protocol (GTP) tunnel (namely, a GTP-U tunnel) is established for a data resource bearer (DRB) of each UE). Data of UE is routed between a DU and the CU in an IAB donor through an IP layer.

Figure 2B:
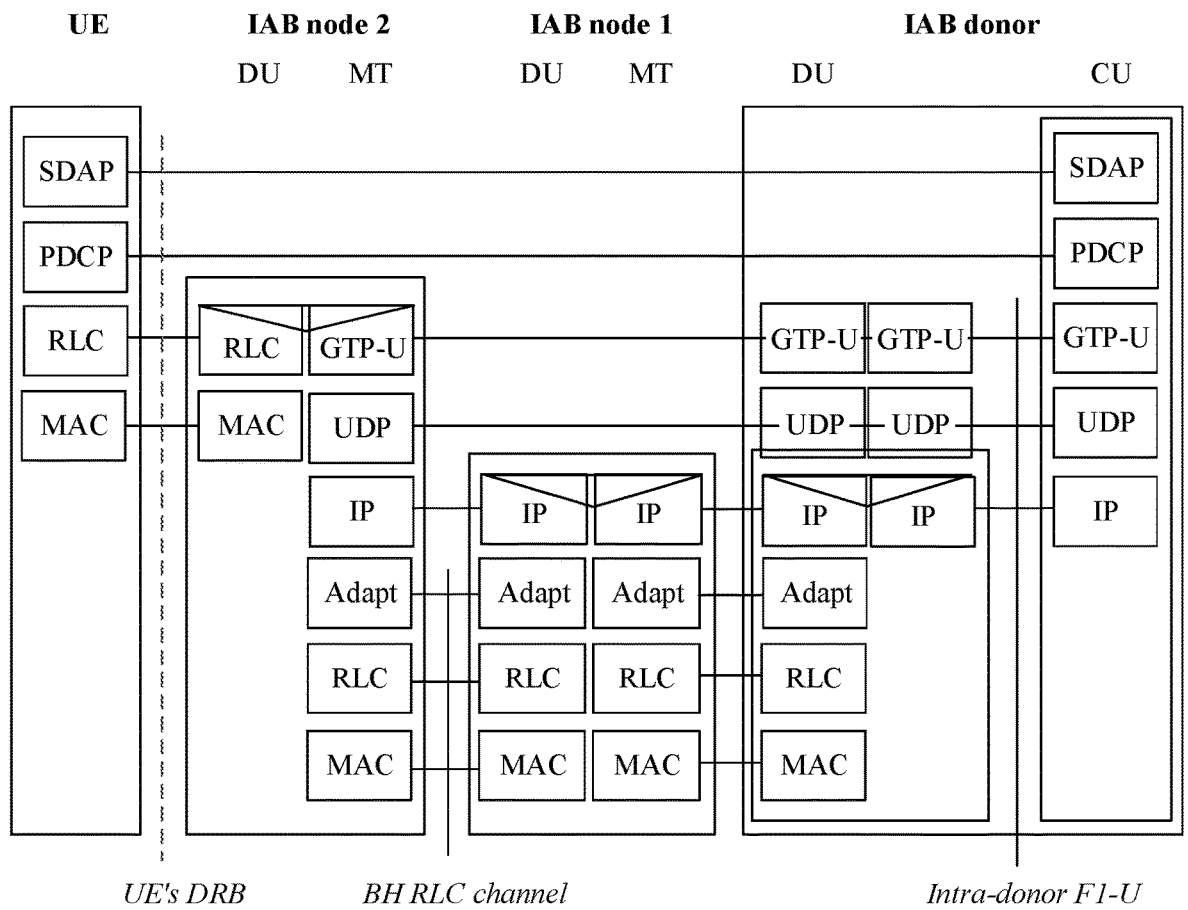
FIG. 2B is a second schematic architectural diagram of a communication system according to an embodiment of this application.

FIG. 2B is a second schematic architectural diagram of a communication system according to an embodiment of this application. In an IAB system having an architecture shown in FIG. 2B, a per UE per bearer GTP tunnel (namely, a GTP-U tunnel) is established between an IAB node 2 and an IAB donor DU. GTP tunnel between the DU and a CU in an IAB donor may be per UE per bearer, or may be per IAB node 1 MT per bearer tunnel (to be specific, a corresponding GTP-U tunnel (namely, a GTP-U tunnel) is established for a data radio bearer of each IAB node 1 MT).

Figure 2C:
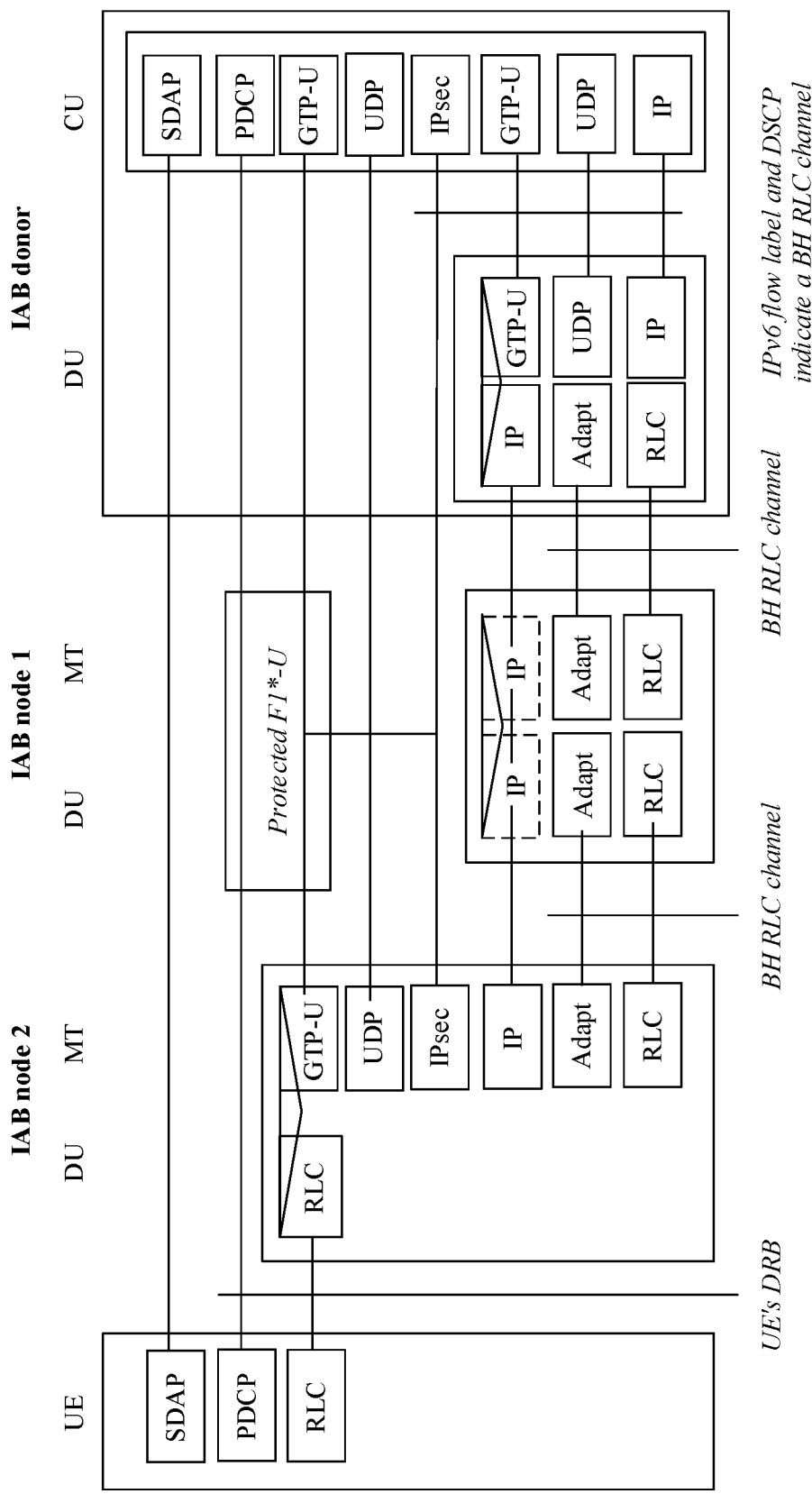
FIG. 2C is a third schematic architectural diagram of a communication system according to an embodiment of this application.

In addition, in addition to the IAB system having the foregoing architecture, an embodiment of this application further provides an IAB system having an architecture. Based on different security mechanisms, the IAB system having the architecture may be further divided into the following. FIG. 2C is a third schematic architectural diagram of a communication system according to an embodiment of this application. In an IAB system having an architecture shown in FIG. 2C, the internet security protocol (IPsec) is used to perform security protection on a GTP tunnel. In this case, per UE per bearer GTP tunnel is established between an IAB node 2 and an IAB donor CU. GTP tunnel between a DU and the CU in an IAB donor may be per UE per bearer, or may be per IAB node 1 MT per bearer. The IPsec is used to perform security protection on per UE per bearer GTP tunnel.

Figure 2D:
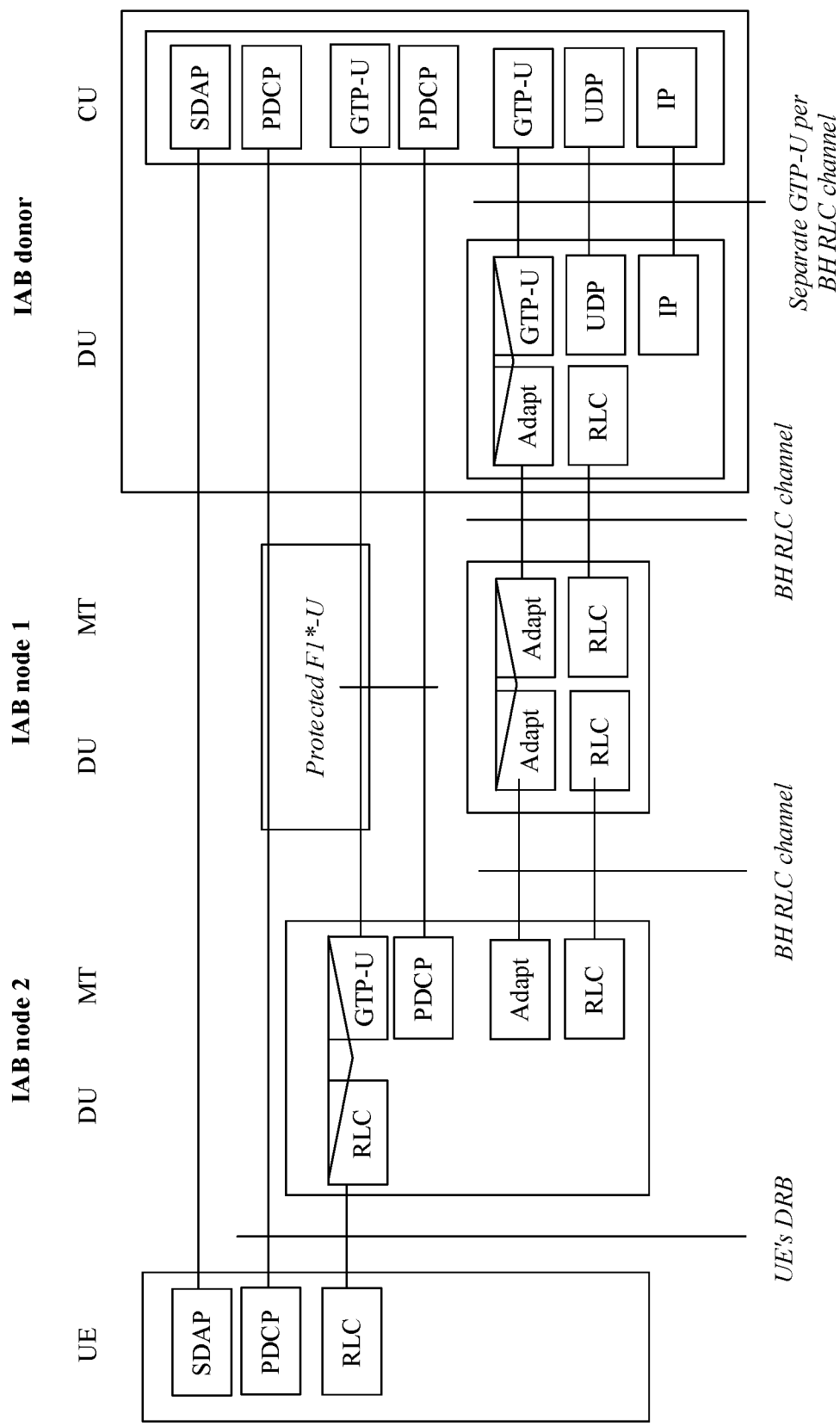
FIG. 2D is a fourth schematic architectural diagram of a communication system according to an embodiment of this application.

FIG. 2D is a fourth schematic architectural diagram of a communication system according to an embodiment of this application. In an IAB system having an architecture shown in FIG. 2D, a packet data convergence protocol (PDCP) is used to perform security protection on GTP tunnel. In this case, per UE per bearer GTP tunnel is established between an IAB node 2 and an IAB donor CU. GTP tunnel between a DU and the CU in an IAB donor may be per UE per bearer, or may be per IAB node 1 MT per bearer. A PDCP layer is used to perform security protection on per UE per bearer GTP tunnel.

An embodiment of this application provides a data transmission method, and the method may be used in the foregoing IAB system. The following describes the data transmission method in detail with reference to the IAB systems having the different architectures in the foregoing two-hop data backhaul scenario.

Embodiment 1

An embodiment of this application provides a data transmission method, and the method is used in the IAB system shown in FIG. 2A.

It should be noted that, in Embodiment 1, an IAB donor CU manages bearer mapping on each interface during user data transmission.

Figure 3:
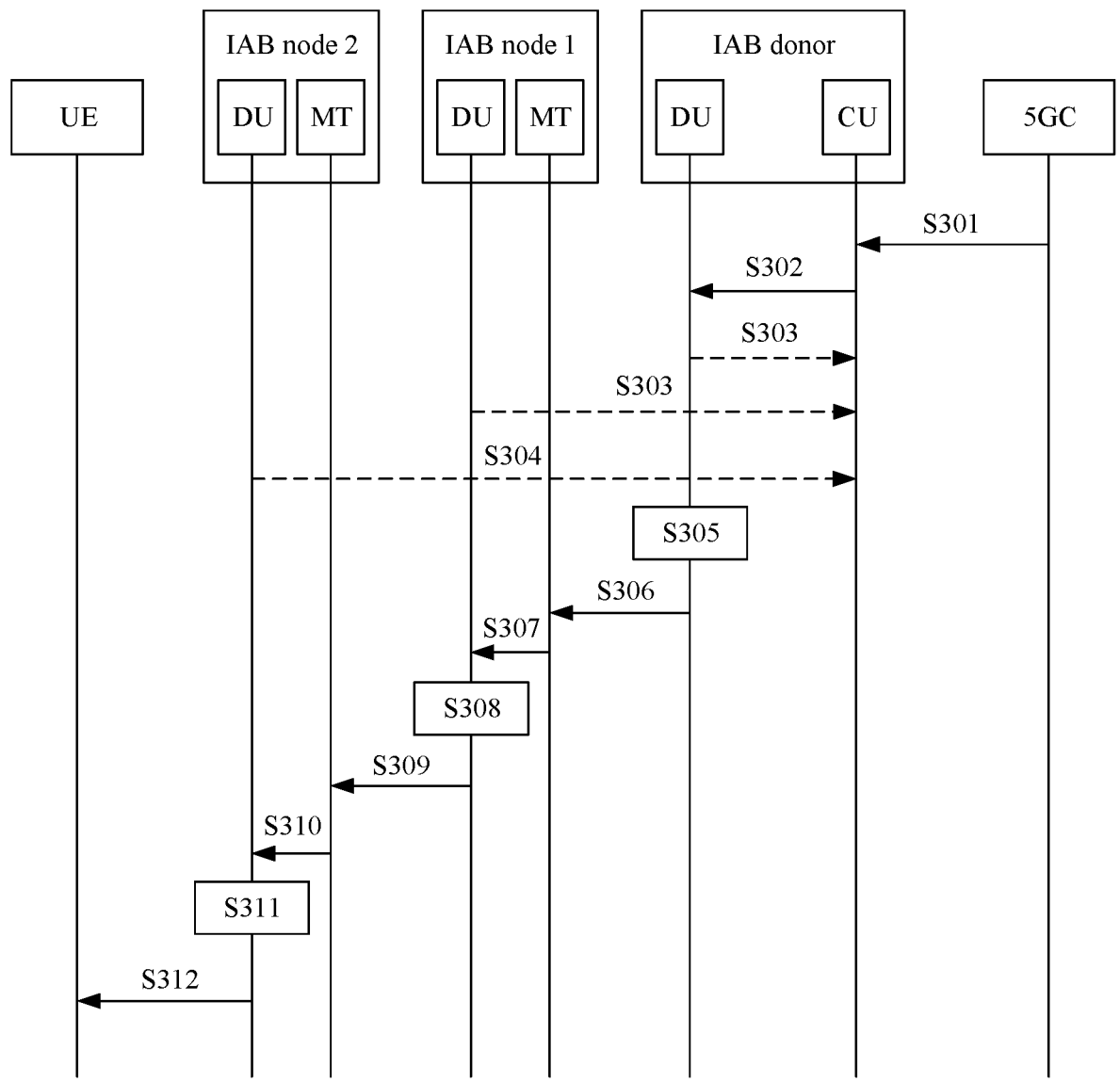
FIG. 3 is a schematic flowchart 1 of a downlink data transmission method in an architecture in FIG. 2A according to an embodiment of this application.

FIG. 3 is a schematic flowchart 1 of a downlink data transmission method in the architecture in FIG. 2A according to an embodiment of this application. Referring to solid lines in FIG. 3, the downlink data transmission method may include the following steps.

S301: The IAB donor CU receives downlink data of UE.

S302: The IAB donor CU includes service attribute information of the downlink data in an IP layer header field, and sends the IP layer header field and the downlink data together to an IAB donor DU.

Herein, the service attribute information of the downlink data may be: DSCP/flow label (indicating a DSCP or a flow label).

In this embodiment of this application, to enable the IAB donor CU to manage the bearer mapping on each interface during the user data transmission, the IAB donor DU and IAB node DUs need to each send, to the IAB donor CU, a logical channel identity (LCID) corresponding to a BH RLC channel. In this case, a BH RLC channel identity may be the logical channel identity corresponding to the BH RLC channel.

Specifically, the IAB donor DU allocates a logical channel corresponding to a BH RLC channel that is on an Un1 interface, an IAB node 1 DU allocates a logical channel corresponding to a BH RLC channel that is on an Un2 interface, and an IAB node 2 DU allocates a logical channel corresponding to a UE DRB that is on a Uu interface. Therefore, to help the IAB donor CU manage user plane bearer mapping on each interface, the IAB donor DU needs to feed back an LCID of the logical channel allocated to the BH RLC channel that is on the Un1 interface to the IAB donor CU, and the IAB node 1 DU needs to feed back an LCID of the logical channel allocated to the BH RLC channel that is on the Un2 interface to the IAB donor CU. Then, referring to dashed lines in FIG. 3, the foregoing method may further include the following step: S303: The IAB donor DU sends a logical channel identity corresponding to a BH RLC channel to the IAB donor CU, and the IAB node 1 DU sends a logical channel identity corresponding to a BH RLC channel to the IAB donor CU.

It should be noted that the BH RLC channel identity may be the logical channel identity corresponding to the BH RLC channel.

Then, the IAB donor CU may determine a correspondence between service attribute information and a BH RLC channel identity based on the BH RLC channel identity sent by the IAB donor DU. For example, the IAB donor CU determines a correspondence between a DSCP/flow label and a BH RLC channel identity that is on the Un1 interface, or the IAB donor CU determines a correspondence between DSCP/flow label+access IAB node address information and a BH RLC channel identity that is on the Un1 interface. Then the IAB donor CU sends the determined DSCP/flow label and corresponding BH RLC channel identity that is on the Un1 interface or the determined DSCP/flow label+access IAB node address information and corresponding BH RLC channel identity that is on the Un1 interface to the IAB donor DU through an F1AP message between the IAB donor CU and the IAB donor DU.

In addition, based on the BH RLC channel identity sent by the IAB node 1 DU, the IAB donor CU may determine a correspondence between a BH RLC channel identity of a previous-hop backhaul link (on the Un1 interface) and a BH RLC channel identity of a next-hop backhaul link (on the Un2 interface), or determine a correspondence between a service bearer identity (UE Bearer ID) and a BH RLC channel identity, or determine a correspondence between service attribute information and a BH RLC channel identity, or determine a correspondence between a BH RLC channel identity, and service attribute information and access IAB node address information. Then, the IAB donor CU sends, to the IAB node 1 DU through an F1AP message between the IAB donor CU and the IAB node 1 DU, the determined BH RLC channel identity on the Un1 interface and BH RLC channel identity on the Un2 interface, or the determined UE bearer ID and BH RLC channel identity, or the determined DSCP/flow label and BH RLC channel identity, or the DSCP/flow label+access IAB node address information and the BH RLC channel identity that are determined.

In some possible implementations, the IAB node 2 DU may also feed back an LCID of the logical channel allocated to the UE DRB on the Uu interface to the IAB donor CU. In this case, still referring to the dashed lines in FIG. 3, the foregoing method may further include the following step: S304: The IAB node 2 DU sends the LCID that is on the Uu interface to the IAB donor CU. Based on the LCID that is on the Uu interface sent by the IAB node 2 DU, the IAB donor CU may determine a correspondence between a BH RLC channel identity on the Un2 interface and a DRB ID/an LCID that is on the Uu interface, or determine a correspondence between a UE bearer ID and a DRB ID/an LCID that is on the Uu interface, or determine a correspondence between a DSCP/flow label and a DRB ID/an LCID that is on the Uu interface, or determine a correspondence between a DSCP/flow label+access IAB node address information and a DRB ID/an LCID that is on the Uu interface. Then, the IAB donor CU sends, to the IAB node 2 DU through an F1AP message between the IAB donor CU and the IAB node 2 DU, the determined BH RLC channel identity on the Un2 interface and corresponding DRB ID/LCID on the Uu interface, or the determined UE bearer ID and corresponding DRB ID/LCID that is on the Uu interface, or the determined DSCP/flow label and corresponding DRB ID/LCID that is on the Uu interface, or the determined DSCP/flow label+access IAB node address information and corresponding DRB ID/LCID that is on the Uu interface.

It should be noted that the UE Bearer ID may be used to distinguish between different bearers of different UEs under the IAB donor CU, and may be a newly defined identity, or may be represented by using two parts: a UE identity and a bearer identity, or may be represented by using a tunnel endpoint identifier (GTP TEID, Tunnel Endpoint ID). Certainly, the UE bearer ID may alternatively be represented in another form. This is not specifically limited in this embodiment of this application.

Next, still referring to the solid lines in FIG. 3, S305 is performed after S302.

S305: The IAB donor DU extracts the service attribute information (such as the DSCP/flow label) of the downlink data from the IP layer header field, and determines a first BH RLC channel identity corresponding to the service attribute information of the downlink data, based on the correspondence that is sent by the IAB donor CU and that is between a DSCP/flow label and a BH RLC channel that is on the Un1 interface.

Alternatively, the IAB donor DU further extracts the access IAB node address information from the IP layer header field, and determines a first BH RLC channel identity corresponding to the service attribute information of the downlink data and the access IAB node address information, based on the correspondence that is sent by the IAB donor CU and that is between a DSCP/flow label+access IAB node address information and a BH RLC channel that is on the Un1 interface. For example, the access IAB node address information may be a destination ID, namely, an access IAB node IP address (for example, an IAB node 2 IP address).

S306: The IAB donor DU maps the downlink data to a BH RLC channel corresponding to the first BH RLC channel identity on the Un1 interface, and sends the downlink data to an IAB node 1 MT (namely, a next-hop IAB node).

In some possible implementations, the IAB donor DU may send, to the IAB node 1 MT, a service bearer identity, the service attribute information, or the service attribute information and the access IAB node address information that correspond to the downlink data and that are carried in an adaptation layer. The IAB donor DU may obtain a correspondence between service attribute information (such as the DSCP/flow label) and a UE bearer ID from the IAB donor CU, or the IAB donor DU may obtain a correspondence between a UE bearer ID, and service attribute information (such as the DSCP/flow label) and access IAB node address information from the IAB donor CU. In this way, the IAB donor DU may learn of a corresponding UE bearer ID based on the DSCP/flow label extracted from an IP layer, or based on the DSCP/flow label+access IAB node address information that are extracted from an IP layer, and then send the UE bearer ID carried in the adaptation layer to the IAB node 1 MT.

In some possible implementations, the IAB donor CU may further send, to the IAB donor DU, the access IAB node address information corresponding to the downlink data, namely, the access IAB node (namely, IAB node 2) IP address corresponding to the downlink data. In this case, the IAB donor DU may send, to the IAB node 1 MT, the service attribute information (namely, the DSCP/flow label) that corresponds to the downlink data and that is carried in the adaptation layer, or may send, to the IAB node 1 MT, the DSCP/flow label+access IAB node address information (representing the DSCP/flow label and the access IAB node address information).

S307: The IAB node 1 MT sends the downlink data to the IAB node 1 DU through an internal interface, and also sends at least one of information of the downlink data to the IAB node 1 DU through the internal interface.

The at least one of information of the downlink data may include: the BH RLC channel identity, the service bearer identity, the service attribute information, or the service attribute information and the access IAB node address information. In other words, the IAB node 1 MT sends the BH RLC channel identity carried on the Un1 interface to the IAB node 1 DU through the internal interface, or sends the UE bearer ID corresponding to the downlink data to the IAB node 1 DU through the internal interface. Alternatively, the IAB node 1 MT sends the DSCP/flow label corresponding to the downlink data or the DSCP/flow label+access IAB node address information corresponding to the downlink data to the IAB node 1 DU through the internal interface.

It should be noted that, the service bearer identity, the service attribute information, or the service attribute information and the access IAB node address information that are sent by the IAB node 1 MT to the IAB node 1 DU are sent, while being carried in the adaptation layer, by the IAB donor DU to the IAB node 1 MT. Certainly, the adaptation layer may alternatively carry the DSCP/flow label+access IAB node address information.

S308: The IAB node 1 DU determines a second BH RLC channel identity corresponding to the at least one of information of the downlink data, based on the BH RLC channel identity of the previous-hop backhaul link (on the Un1 interface) and the BH RLC channel identity of the next-hop backhaul link (on the Un2 interface), or the service bearer identity and the BH RLC channel identity, or the service attribute information and the BH RLC channel identity, or the service attribute information and the access IAB node address information, and the BH RLC channel identity that are sent by the IAB donor CU. The BH RLC channel identity of the previous-hop backhaul link corresponds to the BH RLC channel identity of the next-hop backhaul link, the service bearer identity corresponds to the BH RLC channel identity, the service attribute information corresponds to the BH RLC channel identity, and the service attribute information and the access IAB node address information correspond to the BH RLC channel identity.

For example, the BH RLC channel identity of the previous-hop backhaul link may include an identity of the previous-hop backhaul link and the BH RLC channel identity. The identity of the previous-hop backhaul link may be an identity of a previous-hop node, for example, address information of the previous-hop node.

For example, the BH RLC channel identity of the next-hop backhaul link may include an identity of the next-hop backhaul link and the BH RLC channel identity. The identity of the next-hop backhaul link may be an identity of a next-hop node, for example, address information of the next-hop node.

Specifically, if the IAB node 1 DU receives the BH RLC channel identity, carried on the Un1 interface, of the downlink data from the IAB node 1 MT through the internal interface, the IAB node 1 DU may determine a second BH RLC channel identity corresponding to the BH RLC channel identity of the downlink data on the Un1 interface, based on the correspondence that is obtained from the IAB donor CU and that is between a BH RLC channel identity on the Un1 interface and a BH RLC channel identity on the Un2 interface.

Alternatively, if the IAB node 1 DU receives the UE bearer ID of the downlink data from the IAB node 1 MT through the internal interface, the IAB node 1 DU may determine a second BH RLC channel identity corresponding to the UE bearer ID of the downlink data, based on the correspondence that is obtained from the IAB donor CU and that is between a UE bearer ID and a BH RLC channel identity that is on the Un2 interface.

In actual application, the IAB node 1 DU may send the UE bearer ID, carried in the adaptation layer, of the downlink data to an IAB node 2 MT.

In addition, if the IAB node 1 DU receives the service attribute information, namely, the DSCP/flow label, or the service attribute information and the access IAB node IP address, that is, the DSCP/flow label+access IAB node address information, of the downlink data from the IAB node 1 MT through the internal interface, the IAB node 1 DU may determine a second BH RLC channel identity corresponding to the service attribute information of the downlink data, based on the correspondence that is obtained from the IAB donor CU and that is between a DSCP/flow label or a DSCP/flow label+access IAB node address information and a BH RLC channel identity that is on the Un2 interface.

In actual application, the IAB node 1 DU may send, to the IAB node 2 MT, the DSCP/flow label or the DSCP/flow label+access IAB node address information that are of the downlink data and that are carried in the adaptation layer.

S309: The IAB node 1 DU maps the downlink data to a BH RLC channel corresponding to the second BH RLC channel identity, and sends the downlink data to the IAB node 2 MT (namely, a next-hop IAB node).

S310: The IAB node 2 MT sends the downlink data to the IAB node 2 DU through an internal interface, and also sends the at least one of information of the downlink data to the IAB node 2 DU through the internal interface.

Herein, an implementation process of S310 is similar to an implementation process of S307. Details are not described herein again.

S311: The IAB node 2 DU determines a first DRB ID/first LCID that is on the Uu interface and that corresponds to the at least one of information of the downlink data, based on the correspondence that is sent by the IAB donor CU and that is between a BH RLC channel identity on the Un2 interface and a DRB ID/an LCID on the Uu interface, or the correspondence that is sent by the IAB donor CU and that is between a service bearer identity (UE Bearer ID) and a DRB ID/an LCID that is on the Uu interface, or the correspondence that is determined by the IAB donor CU and that is between a DSCP/flow label and a DRB ID/an LCID that is on the Uu interface, or the correspondence that is determined by the IAB donor CU and that is between a DSCP/flow label+access IAB node address information and a DRB ID/an LCID that is on the Uu interface.

Specifically, if the IAB node 2 DU receives, from the IAB node 2 MT through the internal interface, the BH RLC channel identity, of the downlink data, carried on the Un2 interface, the IAB node 2 DU may determine a first DRB ID/first LCID corresponding to the BH RLC channel identity, of the downlink data, carried on the Un2 interface, based on the correspondence that is obtained from the IAB donor CU and that is between a BH RLC channel identity on the Un2 interface and a DRB ID/an LCID on the Uu interface.

Alternatively, if the IAB node 2 DU receives the UE bearer ID of the downlink data from the IAB node 2 MT through the internal interface, the IAB node 2 DU may determine a first DRB ID/first LCID corresponding to the UE bearer ID of the downlink data, based on the correspondence that is obtained from the IAB donor CU and that is between a UE bearer ID and a DRB ID/an LCID that is on the Uu interface.

Alternatively, if the IAB node 2 DU receives the DSCP/flow label of the downlink data or the DSCP/flow label+access IAB node address information of the downlink data from the IAB node 2 MT through the internal interface, the IAB node 2 DU may determine a first DRB ID/first LCID corresponding to the service attribute information of the downlink data, based on the correspondence that is obtained from the IAB donor CU and that is between a DSCP/flow label or a DSCP/flow label+access IAB node address information and a DRB ID/an LCID that is on the Uu interface.

S312: The IAB node 1 DU maps the downlink data to a DRB corresponding to the first DRB ID or a logical channel corresponding to the first LCID, and sends the downlink data to the UE.

Figure 4:
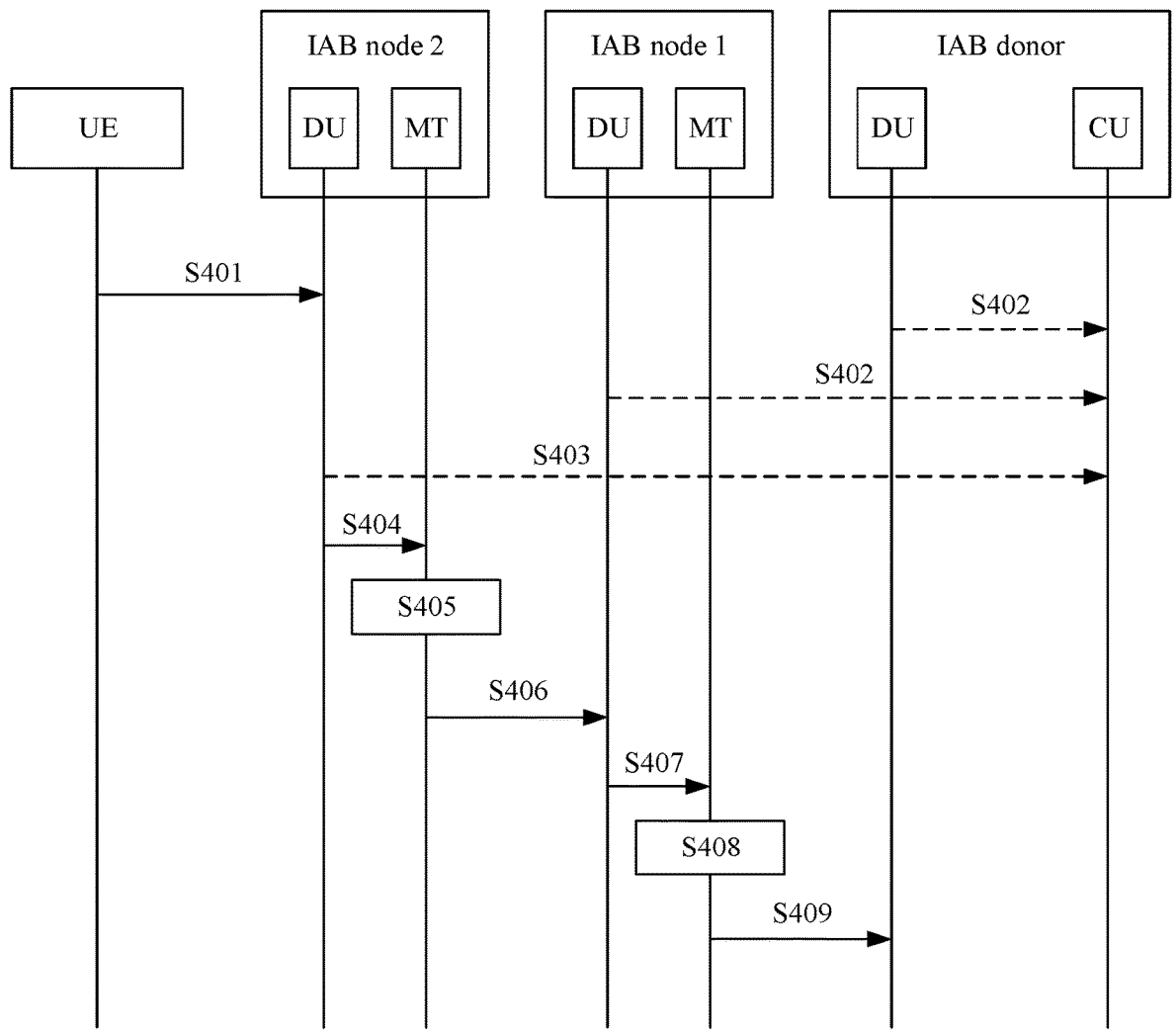
FIG. 4 is a schematic flowchart 1 of an uplink data transmission method in an architecture in FIG. 2A according to an embodiment of this application.

FIG. 4 is a schematic flowchart 2 of an uplink data transmission method in an architecture in FIG. 2A according to an embodiment of this application. Referring to solid lines in FIG. 4, similar to the foregoing downlink data transmission method, the uplink data transmission method may include the following steps.

S401: The UE maps uplink data to a DRB/logical channel corresponding to the Uu interface, and sends the uplink data to the IAB node 2 DU (namely, a next-hop IAB node).

In this embodiment of this application, it is similar to the foregoing downlink data transmission method that, to enable the IAB donor CU to manage bearer mapping on each interface during user data transmission, the IAB donor DU and the IAB node DUs need to each send, to the IAB donor CU, a logical channel identity (LCID) corresponding to a BH RLC channel. In this case, a BH RLC channel identity may be the logical channel identity corresponding to the BH RLC channel. Then, referring to dashed lines in FIG. 4, the foregoing method may further include the following step:

S402: The IAB donor DU sends a BH RLC channel identity to the IAB donor CU, and the IAB node 1 DU sends a BH RLC channel identity to the IAB donor CU.

Then, the IAB donor CU may determine a correspondence between service attribute information and a BH RLC channel identity based on the BH RLC channel identities sent by the IAB donor DU and the IAB node 1 DU. For example, the IAB donor CU determines a DSCP/flow label and a corresponding BH RLC channel identity that is on an Un1 interface, or the IAB donor CU determines a DSCP/flow label+access IAB node address information and a corresponding BH RLC channel identity that is on an Un1 interface. Then the IAB donor CU sends the determined DSCP/flow label and corresponding BH RLC channel identity that is on the Un1 interface or the determined DSCP/flow label+access IAB node address information and corresponding BH RLC channel identity that is on the Un1 interface to the IAB donor DU through an F1 AP message between the IAB donor CU and the IAB donor DU.

In addition, based on the BH RLC channel identity sent by the IAB node 1 DU, the IAB donor CU may determine a correspondence between a BH RLC channel identity of a previous-hop backhaul link (on the Un1 interface) and a BH RLC channel identity of a next-hop backhaul link (on the Un2 interface), or a correspondence between a service bearer identity and a BH RLC channel identity, or a correspondence between service attribute information and a BH RLC channel identity, or a correspondence between a BH RLC channel identity, and service attribute information and access IAB node address information. Then, the IAB donor CU sends, to an IAB node 1 MT through a radio resource control (RRC) message between the IAB donor CU and the IAB node 1 MT, a determined BH RLC channel identity on the Un1 interface and BH RLC channel identity on the Un2 interface, or a determined UE bearer ID and BH RLC channel identity, or a determined DSCP/flow label and BH RLC channel identity, or a DSCP/flow label+access IAB node address information and a BH RLC channel identity that are determined.

In some possible implementations, the IAB node 2 DU may also feed back an LCID of a logical channel allocated to a UE DRB on the Uu interface to the IAB donor CU. In this case, still referring to the dashed lines in FIG. 4, the foregoing method may further include the following step: S403: The IAB node 2 DU sends an LCID that is on the Uu interface to the IAB donor CU. Based on the LCID that is on the Uu interface and that is sent by the IAB node 2 DU, the IAB donor CU may determine a correspondence between a BH RLC channel identity on the Un2 interface and a DRB ID/an LCID on the Uu interface, or determine a correspondence between a UE bearer ID and a BH RLC channel identity that is on the Un2 interface, or determine a correspondence between a DSCP/flow label and a BH RLC channel identity that is on the Un2 interface, or determine a correspondence between a DSCP/flow label+access IAB node address information and a BH RLC channel identity that is on the Un2 interface. Then, the IAB donor CU sends, to the IAB node 2 MT through an RRC message between the IAB donor CU and the IAB node 2 MT, a determined BH RLC channel identity on the Un2 interface and corresponding DRB ID/LCID on the Uu interface, a determined UE Bearer ID and the determined BH RLC channel identity that is on the Un2 interface, a determined DSCP/flow label and the determined BH RLC channel identity that is on the Un2 interface, and/or the DSCP/flow label+access IAB node address information and the BH RLC channel identity that is on the Un2 interface that are determined.

In this embodiment of this application, the IAB node 1 MT may further obtain, from the IAB node 1 DU, the correspondence that is determined by the IAB donor CU and that is between a BH RLC channel identity on the Un1 interface and a BH RLC channel identity on the Un2 interface, or the determined correspondence between a UE Bearer ID and a BH RLC channel identity, or the determined correspondence between a DSCP/flow label and a BH RLC channel identity, or the determined correspondence between a DSCP/flow label+access IAB node address information and a BH RLC channel identity. Similarly, the IAB node 2 MT may further obtain, from the IAB node 2 DU, the correspondence that is determined by the IAB donor CU and that is between a BH RLC channel identity on the Un2 interface and a DRB ID/an LCID on the Uu interface, or the determined correspondence between a UE Bearer ID and a BH RLC channel identity that is on the Un2 interface, or the determined correspondence between a DSCP/flow label and a BH RLC channel identity that is on the Un2 interface, or the determined correspondence between a DSCP/flow label+access IAB node address information and a BH RLC channel identity that is on the Un2 interface.

Next, still referring to the solid lines in FIG. 4, S404 is performed after S401.

S404: The IAB node 2 DU sends the uplink data to the IAB node 2 MT through the internal interface, and also sends at least one of information of the uplink data to the IAB node 2 MT through the internal interface.

It is similar to a process of performing S307 that, the at least one type of information of the uplink data may include: the BH RLC channel identity, the UE Bearer ID, the service attribute information, or the service attribute information and the access IAB node address information. In other words, the IAB node 2 DU sends the DRB ID/LCID, carried on the Uu interface, of the uplink data to the IAB node 2 MT through the internal interface, or sends the UE bearer ID of the uplink data to the IAB node 2 MT through the internal interface, or sends the service attribute information DSCP/flow label of the uplink data or the DSCP/flow label+access IAB node address information of the uplink data to the IAB node 2 MT through the internal interface.

In this embodiment of this application, in S403, the IAB node 2 DU receives the uplink data from the DRB/logical channel corresponding to the Uu interface, and learns of the UE bearer ID, the DSCP/flow label, or the DSCP/flow label+access IAB node label address information that correspond to the uplink data, the correspondence between a UE bearer ID and a DRB ID/an LCID that is on the Uu interface, or the correspondence between a DSCP/flow label or a DSCP/flow label+access IAB node address information and a DRB ID/an LCID that is on the Uu interface, where the correspondence is obtained from the IAB donor CU.

S405: The IAB node 2 MT determines a fourth BH RLC channel identity corresponding to the at least one of information of the uplink data, based on the correspondence between a BH RLC channel identity on the Un2 interface and a DRB ID/an LCID on the Uu interface, or the correspondence between a UE Bearer ID and a BH RLC channel identity that is on the Un2 interface, or the correspondence between a DSCP/flow label and a BH RLC channel identity that is on the Un2 interface, or the correspondence between a DSCP/flow label+access IAB node address information and a BH RLC channel identity that is on the Un2 interface, where the correspondence is sent by the IAB donor CU or the IAB node 2 DU.

Specifically, if the IAB node 2 MT receives the DRB/LCID, carried on the Uu interface, of the uplink data from the IAB node 2 DU through the internal interface, the IAB node 2 MT may determine a fourth RLC channel corresponding to the DRB/LCID, carried on the Uu interface, of the uplink data, based on the correspondence that is obtained from the IAB donor CU or the IAB node 2 DU and that is between a BH RLC channel identity on the Un2 interface and a DRB ID/an LCID on the Uu interface.

Alternatively, if the IAB node 2 MT receives the UE bearer ID of the uplink data from the IAB node 2 DU through the internal interface, the IAB node 2 MT may determine a fourth BH RLC channel identity corresponding to the UE bearer ID of the uplink data, based on the correspondence that is obtained from the IAB donor CU or the IAB node 2 DU and that is between a UE bearer ID and a BH RLC channel that is on the Un2 interface.

In actual application, the IAB node 2 MT may send the UE bearer ID, carried in an adaptation layer, of the uplink data to the IAB node 1 DU.

In addition, if the IAB node 2 MT receives the DSCP/flow label or the DSCP/flow label+access IAB node address information of the uplink data of the UE from the IAB node 2 DU through the internal interface, the IAB node 2 MT may determine a fourth BH RLC channel identity corresponding to the DSCP/flow label of the uplink data or the DSCP/flow label+access IAB node address information of the uplink data, based on the correspondence that is obtained from the IAB donor CU or the IAB node 2 DU and that is between a DSCP/flow label or a DSCP/flow label+access IAB node address information and a BH RLC channel identity on the Un2 interface.

In addition, the IAB node 2 MT may send, to the IAB node 1 DU, the DSCP/flow label or the DSCP/flow label+access IAB node address information that are of the uplink data and that are carried in the adaptation layer.

S406: The IAB node 2 MT maps the uplink data to a BH RLC channel that is on the Un2 interface and that is corresponding to the fourth BH RLC channel identity, and sends the uplink data to the IAB node 1 DU (namely, a next-hop IAB node).

S407: The IAB node 1 DU sends the uplink data to the IAB node 1 MT through an internal interface, and also sends at least one of information of the uplink data to the IAB node 1 MT through the internal interface.

Herein, an implementation process of S406 is similar to an implementation process of S403. Details are not described herein again.

S408: The IAB node 1 MT determines a fifth BH RLC channel identity corresponding to the at least one of information of the uplink data, based on the correspondence between a BH RLC channel identity of a previous-hop backhaul link (on the Un1 interface) and a BH RLC channel identity of a next-hop backhaul link (on the Un2 interface), or the correspondence between a UE bearer ID and a BH RLC channel identity, or the correspondence between service attribute information and a BH RLC channel identity, or the correspondence between a BH RLC channel identity, and service attribute information and access IAB node address information, where the correspondence is sent by the IAB donor CU or the IAB node 1 DU.

Specifically, if the IAB node 1 MT receives the BH RLC channel identity, carried on the Un2 interface, of the uplink data from the IAB node 1 DU through the internal interface, the IAB node 1 MT may determine a fifth BH RLC channel identity corresponding to the BH RLC channel identity, carried on the Un2 interface, of the uplink data, based on the correspondence that is obtained from the IAB donor CU or the IAB node 1 DU and that is between a BH RLC channel identity on the Un1 interface and a BH RLC channel identity on the Un2 interface.

Alternatively, if the IAB node 1 MT receives the UE bearer ID of the uplink data from the IAB node 1 DU through the internal interface, the IAB node 1 MT may determine a fifth BH RLC channel identity corresponding to the UE bearer ID of the uplink data, based on the correspondence that is obtained from the IAB donor CU or the IAB node 1 DU and that is between a UE bearer ID and a BH RLC channel identity that is on the Un1 interface.

In actual application, the IAB node 1 MT may send the UE bearer ID, carried in the adaptation layer, of the uplink data to the IAB donor DU.

In addition, if the IAB node 1 MT receives the DSCP/flow label or the DSCP/flow label+access IAB node address information of the uplink data from the IAB node 1 DU through the internal interface, the IAB node 1 MT may determine a fifth BH RLC channel identity corresponding to the DSCP/flow label of the uplink data or the DSCP/flow label+access IAB node address information of the uplink data, based on the correspondence that is obtained from the IAB donor CU or the IAB node 1 DU and that is between a DSCP/flow label or a DSCP/flow label+access IAB node address information and a BH RLC channel identity on the Un1 interface.

In actual application, the IAB node 1 MT may send, to the IAB donor DU, the DSCP/flow label or the DSCP/flow label+access IAB node address information that are of the uplink data and that are carried in the adaptation layer.

S409: The IAB node 1 MT maps the uplink data to a BH RLC channel that is on the Un1 interface and that is corresponding to the fifth BH RLC channel identity, and sends the uplink data to the IAB donor DU (namely, a next-hop IAB node).

In this embodiment of this application, for data transmission of the uplink data, in addition to the method in the embodiment shown in FIG. 4, each IAB node MT may further determine, based on bearer mapping that occurs when the downlink data is sent, bearer mapping that occurs when the uplink data is sent. In this case, the IAB node 1 MT or the IAB node 2 MT may map the uplink data to a BH RLC channel on which the downlink data is received, and send the downlink data. In this case, the uplink data and the downlink data have same QoS information. Herein, the IAB node MT obtains, from an IAB node DU corresponding to the IAB node MT, a bearer mapping relationship for sending the downlink data, and determines, based on the bearer mapping relationship, a bearer mapping relationship for sending the uplink data.

The service QoS information is a service attribute corresponding to the UE, and may include a service bearer identity (UE bearer ID) and QoS configuration information. The QoS configuration information may include at least one of the following QoS parameters: a 5G QoS identifier (5QI), an allocation and retention priority (ARP), a prioritized bit rate (PBR), a packet delay budget (PDB,), a guaranteed flow bit rate (GFBR), a maximum flow bit rate (MFBR), or the like.

Hereto, the IAB system completes a first type of data transmission in the architecture shown in FIG. 2A.

Embodiment 2

An embodiment of this application provides a data transmission method, and the method is used in the IAB system shown in FIG. 2A.

It should be noted that, in Embodiment 2, bearer mapping on each interface during user data transmission is determined by each node.

Figure 5:
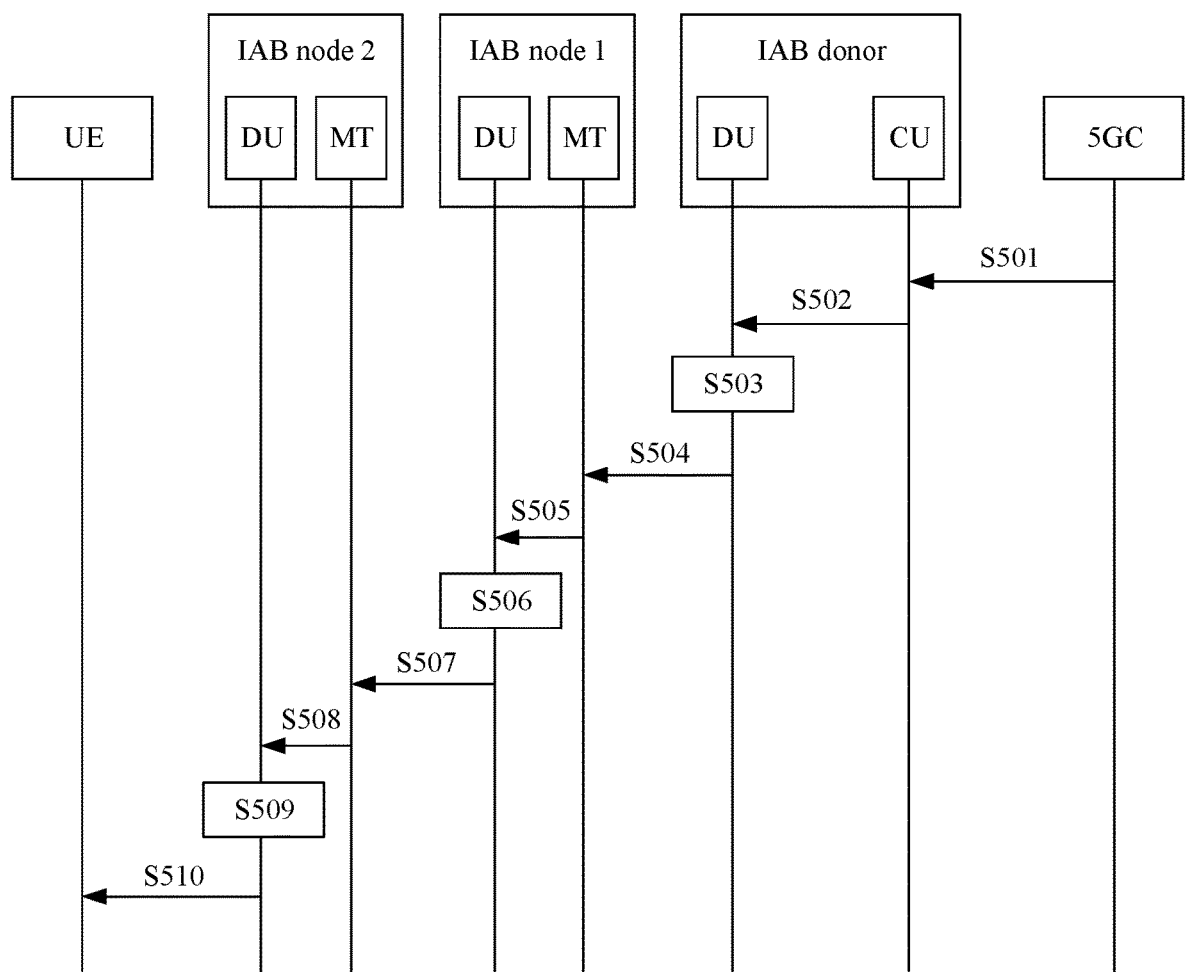
FIG. 5 is a schematic flowchart 2 of a downlink data transmission method in an architecture in FIG. 2A according to an embodiment of this application.

FIG. 5 is a schematic flowchart 2 of a downlink data transmission method in an architecture in FIG. 2A according to an embodiment of this application. Referring to solid lines in FIG. 5, the downlink data transmission method may include the following steps.

S501: An IAB donor CU receives downlink data of UE.

S502: The IAB donor CU includes service attribute information of the downlink data in an IP layer header field, and sends the IP layer header field and the downlink data together to an IAB donor DU.

S503: The IAB donor DU extracts the service attribute information (such as a DSCP/flow label) of the downlink data from the IP layer header field, and determines, based on the service attribute information and corresponding service QoS information that are sent by the IAB donor CU, first service QoS information corresponding to the service attribute information of the downlink data.

Optionally, the IAB donor DU further extracts, from the IP layer header field, destination address information for sending the downlink data. For example, the destination address information may be access IAB node address information, for example, an IAB node 2 IP address. The IAB donor DU determines first service QoS information corresponding to the service attribute information and IAB node 2 IP address of the downlink data, based on the service attribute information, the IAB node 2 IP address, and the corresponding service QoS information that are sent by the IAB donor CU.

In this embodiment of this application, to enable the IAB donor DU to determine bearer mapping on Un1 interface during user data transmission, the IAB donor CU may further send the service attribute information and the service QoS information, where the service attribute information corresponds to the service QoS information. Alternatively, the IAB donor CU may further send the service attribute information+an IAB node 2 IP address and the service QoS information, where the service attribute information+IAB node 2 IP address correspond to the service QoS information. In this case, the IAB donor DU may determine the first service QoS information corresponding to the service attribute information of the downlink data, based on the service attribute information and the corresponding service QoS information that are sent by the IAB donor CU, or the IAB donor DU may determine the first service QoS information corresponding to the service attribute information+IAB node 2 IP address of the downlink data, based on the service attribute information+IAB node 2 IP address and the corresponding service QoS information that are sent by the IAB donor CU.

S504: The IAB donor DU maps the downlink data to a BH RLC channel corresponding to the first service QoS information, and sends the downlink data to an IAB node 1 MT (namely, a next-hop IAB node).

In some possible implementations, the IAB donor DU may send, to the IAB node 1 MT, a service bearer identity, the service attribute information, or the service attribute information+IAB node 2 IP address that correspond to the downlink data and that are carried in an adaptation layer. The IAB donor DU may obtain, from the IAB donor CU, a correspondence between service attribute information (such as the DSCP/flow label) and a UE bearer ID. In this way, the IAB donor DU may learn of a corresponding UE bearer ID based on the DSCP/flow label extracted from an IP layer, and then send the UE bearer ID carried in the adaptation layer to the IAB node 1 MT. Alternatively, the IAB donor DU may obtain, from the IAB donor CU, a correspondence between service attribute information (such as the DSCP/flow label)+an IAB node 2 IP address and a UE bearer ID. In this way, the IAB donor DU may learn of a corresponding UE bearer ID based on the DSCP/flow label+IAB node 2 IP address that are extracted from an IP layer, and then send the UE bearer ID carried in the adaptation layer to the IAB node 1 MT.

In some possible implementations, the IAB donor DU sends, to the IAB node 1 MT, the DSCP/flow label or the DSCP/flow label+access IAB node address information that correspond to the downlink data and that are carried in the adaptation layer.

S505: The IAB node 1 MT sends the downlink data to the IAB node 1 DU through an internal interface, and also sends at least one of information of the downlink data to the IAB node 1 DU through the internal interface.

The at least one of information of the downlink data may include: a BH RLC channel identity, the service bearer identity, the service attribute information, or the service attribute information+access IAB node address information. In other words, the IAB node 1 MT sends the BH RLC channel identity (such as an LCID) carried on an Un1 interface to the IAB node 1 DU through the internal interface, or sends the UE bearer ID corresponding to the downlink data to the IAB node 1 DU through the internal interface. Alternatively, the IAB node 1 MT sends the DSCP/flow label corresponding to the downlink data or the DSCP/flow label+access IAB node address information corresponding to the downlink data to the IAB node 1 DU through the internal interface.

S506: The IAB node 1 DU determines second service QoS information corresponding to the at least one of information of the downlink data, based on the UE bearer ID and the service quality of service QoS information, or the service attribute information and the service QoS information, or the service attribute information+access IAB node address information and the service QoS information, or the BH RLC channel identity and the service QoS information that are sent by the IAB donor CU. The service bearer identity corresponds to the service QoS information, the service attribute information corresponds to the service QoS information, the service attribute information+access IAB node address information correspond to the service QoS information, and the BH RLC channel identity corresponds to the service QoS information.

Specifically, if the IAB node 1 DU receives the BH RLC channel identity, carried on the Un1 interface, of the downlink data from the IAB node 1 MT through the internal interface, the IAB node 1 DU may determine second service QoS information corresponding to the BH RLC channel identity, carried on the Un1 interface, of the downlink data, based on the correspondence that is obtained from the IAB donor CU and that is between a BH RLC channel identity on the Un1 interface and service QoS information.

Alternatively, if the IAB node 1 DU receives the UE bearer ID of the downlink data from the IAB node 1 MT through the internal interface, the IAB node 1 DU may determine second service QoS information corresponding to the UE bearer ID of the downlink data, based on the correspondence that is obtained from the IAB donor CU and that is between a UE bearer ID and service QoS information.

In actual application, the IAB node 1 DU may send the UE bearer ID, carried in the adaptation layer, of the downlink data to an IAB node 2 MT.

In addition, if the IAB node 1 DU receives the DSCP/flow label of the downlink data or the DSCP/flow label+access IAB node address information of the downlink data from the IAB node 1 MT through the internal interface, the IAB node 1 DU may determine second service QoS information corresponding to the service attribute information of the downlink data, based on the correspondence that is obtained from the IAB donor CU and that is between a DSCP/flow label or a DSCP/flow label+access IAB node address information and service QoS information.

In actual application, the IAB node 1 DU may send, to the IAB node 2 MT, the DSCP/flow label or the DSCP/flow label+access IAB node address information that are of the downlink data and that are carried in the adaptation layer.

S507: The IAB node 1 DU maps the downlink data to a BH RLC channel corresponding to the second service QoS information, and sends the downlink data to the IAB node 2 MT (namely, a next-hop IAB node).

S508: The IAB node 2 MT sends the downlink data to the IAB node 2 DU through an internal interface, and also sends the at least one of information of the downlink data to the IAB node 2 DU through the internal interface.

Herein, an implementation process of S308 is similar to an implementation process of S505. Details are not described herein again.

S509: The IAB node 2 DU determines a first DRB ID/first LCID that is on a Uu interface and that corresponds to the at least one of information of the downlink data, based on a correspondence between a BH RLC channel identity on the Un2 interface and a DRB ID/an LCID that is on the Uu interface, or a correspondence between a UE Bearer ID and a DRB ID/an LCID that is on the Uu interface, or a correspondence between a DSCP/flow label and a DRB ID/an LCID that is on the Uu interface, or a correspondence between a DSCP/flow label+access IAB node address information and a DRB ID/an LCID that is on the Uu interface, where the correspondence is sent by the IAB donor CU.

S510: The IAB node 1 DU maps the downlink data to a DRB corresponding to the first DRB ID or a logical channel corresponding to the first LCID, and sends the downlink data to the UE.

Herein, implementation processes of S509 and S510 are similar to implementation processes of S311 and S312 in Embodiment 1. Details are not described herein again.

Figure 6:
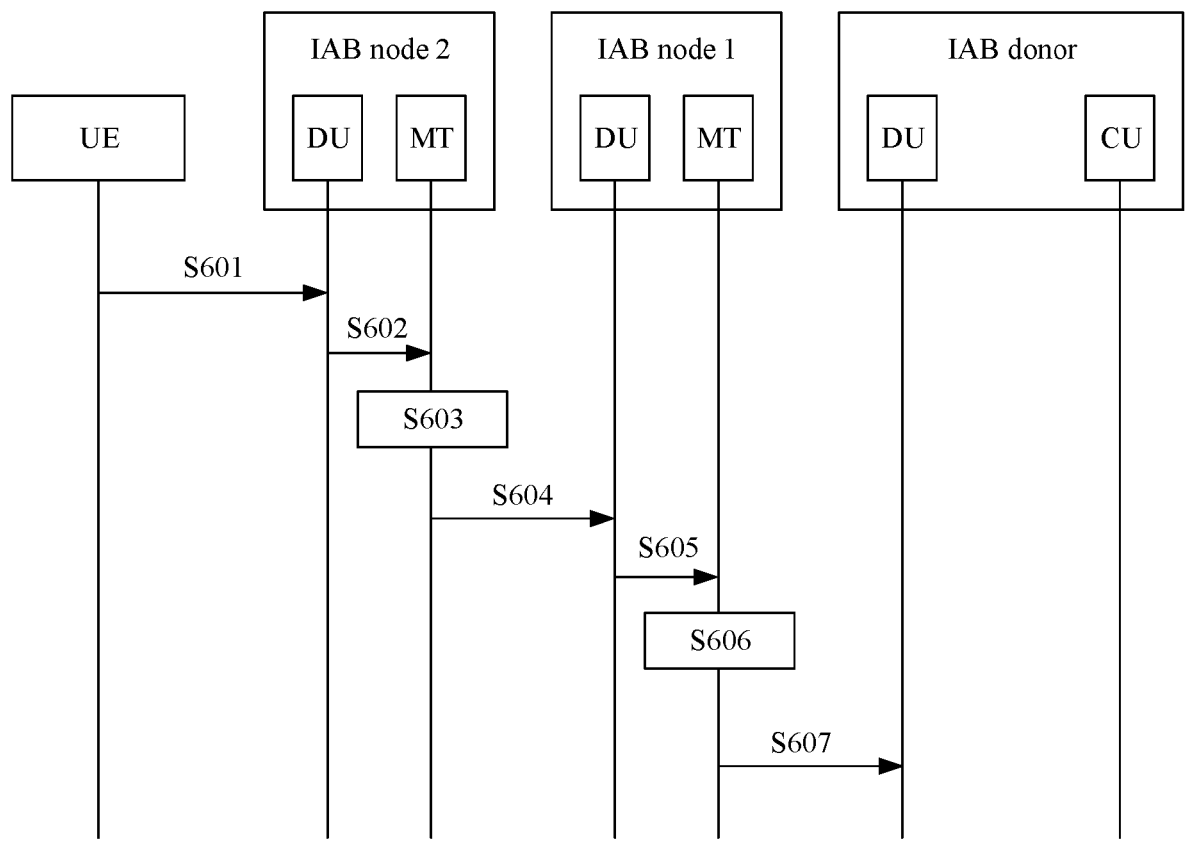
FIG. 6 is a schematic flowchart 2 of an uplink data transmission method in an architecture in FIG. 2A according to an embodiment of this application.

FIG. 6 is a schematic flowchart 1 of an uplink data transmission method in an architecture in FIG. 2A according to an embodiment of this application. Referring to solid lines in FIG. 6, similar to the foregoing downlink data transmission method, the uplink data transmission method may include the following steps.

S601: The UE maps uplink data to a DRB/logical channel corresponding to the Uu interface, and sends the uplink data to the IAB node 2 DU (namely, a next-hop IAB node).

S602: The IAB node 2 DU sends the uplink data to the IAB node 2 MT through the internal interface, and also sends at least one of information of the uplink data to the IAB node 2 MT through the internal interface.

Herein, implementation processes of S601 and S602 are similar to implementation processes of S401 and S402 in Embodiment 1. Details are not described herein again.

S603: The IAB node 2 MT determines third service QoS information corresponding to at least one of information of the uplink data, based on a correspondence between a UE bearer ID and service quality of service QoS information, or a correspondence between service attribute information and service QoS information, or a correspondence between service attribute information+access IAB node address information and service QoS information, or a correspondence between a BH RLC channel identity and service QoS information that are sent by the IAB donor CU.

Specifically, if the IAB node 2 MT receives the UE bearer ID of the uplink data from the IAB node 2 DU through the internal interface, the IAB node 2 MT may determine the third service QoS information corresponding to the UE bearer ID of the uplink data, based on the correspondence that is obtained from the IAB donor CU or the IAB node 2 DU and that is between a UE bearer ID and service QoS information.

In actual application, the IAB node 2 MT may send the UE bearer ID, carried in an adaptation layer, of the uplink data to the IAB node 1 DU.

In addition, if the IAB node 2 MT receives the DSCP/flow label or the DSCP/flow label+access IAB node address information of the uplink data of the UE from the IAB node 2 DU through the internal interface, the IAB node 2 MT may determine third service QoS information corresponding to the DSCP/flow label of the uplink data or the DSCP/flow label+access IAB node address information of the uplink data, based on the correspondence that is obtained from the IAB donor CU or the IAB node 2 DU and that is between a DSCP/flow label or a DSCP/flow label+access IAB node address information and service QoS information.

In addition, the IAB node 2 MT may send, to the IAB node 1 DU, the DSCP/flow label or the DSCP/flow label+access IAB node address information that are of the uplink data and that are carried in the adaptation layer.

S604: The IAB node 2 MT maps the uplink data to a BH RLC channel that is on the Un2 interface and that is corresponding to the third service QoS information of the uplink data, and sends the uplink data to the IAB node 1 DU (namely, a next-hop IAB node).

S605: The IAB node 1 DU sends the uplink data to the IAB node 1 MT through an internal interface, and also sends at least one of information of the uplink data to the IAB node 1 MT through the internal interface.

Herein, an implementation process of S605 is similar to an implementation process of S602. Details are not described herein again.

S606: The IAB node 1 MT determines fifth service QoS information corresponding to the at least one of information of the uplink data, based on a correspondence between a UE bearer ID and service quality of service QoS information, or a correspondence between service attribute information and service QoS information, or a correspondence between service attribute information+access IAB node address information and service QoS information, or a correspondence between a BH RLC channel identity and service QoS information, where the correspondence is sent by the IAB donor CU or the IAB node 1 DU.

Specifically, if the IAB node 1 MT receives the BH RLC channel identity, carried on an Un1 interface, of the uplink data from the IAB node 1 DU through the internal interface, the IAB node 1 MT may determine fifth service QoS information corresponding to the BH RLC channel identity, carried on the Un1 interface, of the uplink data, based on the correspondence that is obtained from the IAB donor CU or the IAB node 1 DU and that is between a BH RLC channel identity on the Un1 interface and service QoS information.

Alternatively, if the IAB node 1 MT receives the UE bearer ID of the uplink data from the IAB node 1 DU through the internal interface, the IAB node 1 MT may determine fifth service QoS information corresponding to the UE bearer ID of the uplink data, based on the correspondence that is obtained from the IAB donor CU or the IAB node 1 DU and that is between a UE bearer ID and service QoS information.

In actual application, the IAB node 1 MT may send the UE bearer ID, carried in the adaptation layer, of the uplink data to the IAB donor DU.

In addition, if the IAB node 1 MT receives the DSCP/flow label or the DSCP/flow label+access IAB node address information of the uplink data of the UE from the IAB node 1 DU through the internal interface, the IAB node 1 MT may determine fifth service QoS information corresponding to the DSCP/flow label of the uplink data or the DSCP/flow label+access IAB node address information of the uplink data, based on the correspondence that is obtained from the IAB donor CU or the IAB node 1 DU and that is between a DSCP/flow label or a DSCP/flow label+access IAB node address information and service QoS information.

In actual application, the IAB node 1 MT may send, to the IAB donor DU, the DSCP/flow label or the DSCP/flow label+access IAB node address information that are of the uplink data and that are carried in the adaptation layer.

S607: The IAB node 1 MT maps the uplink data to a BH RLC channel that is on the Un1 interface and that is corresponding to the fifth service QoS information, and sends the uplink data to the IAB donor DU (namely, a next-hop IAB node).

In this embodiment of this application, for data transmission of the uplink data, in addition to the method in the embodiment shown in FIG. 6, each IAB node MT may further determine, based on bearer mapping that occurs when the downlink data is sent, bearer mapping that occurs when the uplink data is sent. In this case, the IAB node 1 MT or the IAB node 2 MT may map the uplink data to a BH RLC channel on which the downlink data is received, and send the downlink data. In this case, the uplink data and the downlink data have same QoS information. Herein, the IAB node MT obtains, from an IAB node DU corresponding to the IAB node MT, a bearer mapping relationship for sending the downlink data, and determines, based on the bearer mapping relationship, a bearer mapping relationship for sending the uplink data.

Hereto, the IAB system completes a second type of data transmission process in the architecture shown in FIG. 2A.

Embodiment 3

Based on Embodiment 1 and Embodiment 2, an embodiment of this application provides a data transmission method. The method is used in the IAB system shown in FIG. 2B.

It should be noted that, in Embodiment 3, a GTP tunnel established between the IAB donor CU and the IAB donor DU is per UE per bearer. There is one-to-one mapping between the GTP tunnel and a GTP tunnel established between the IAB donor DU and the IAB node 2 DU.

Figure 7A:
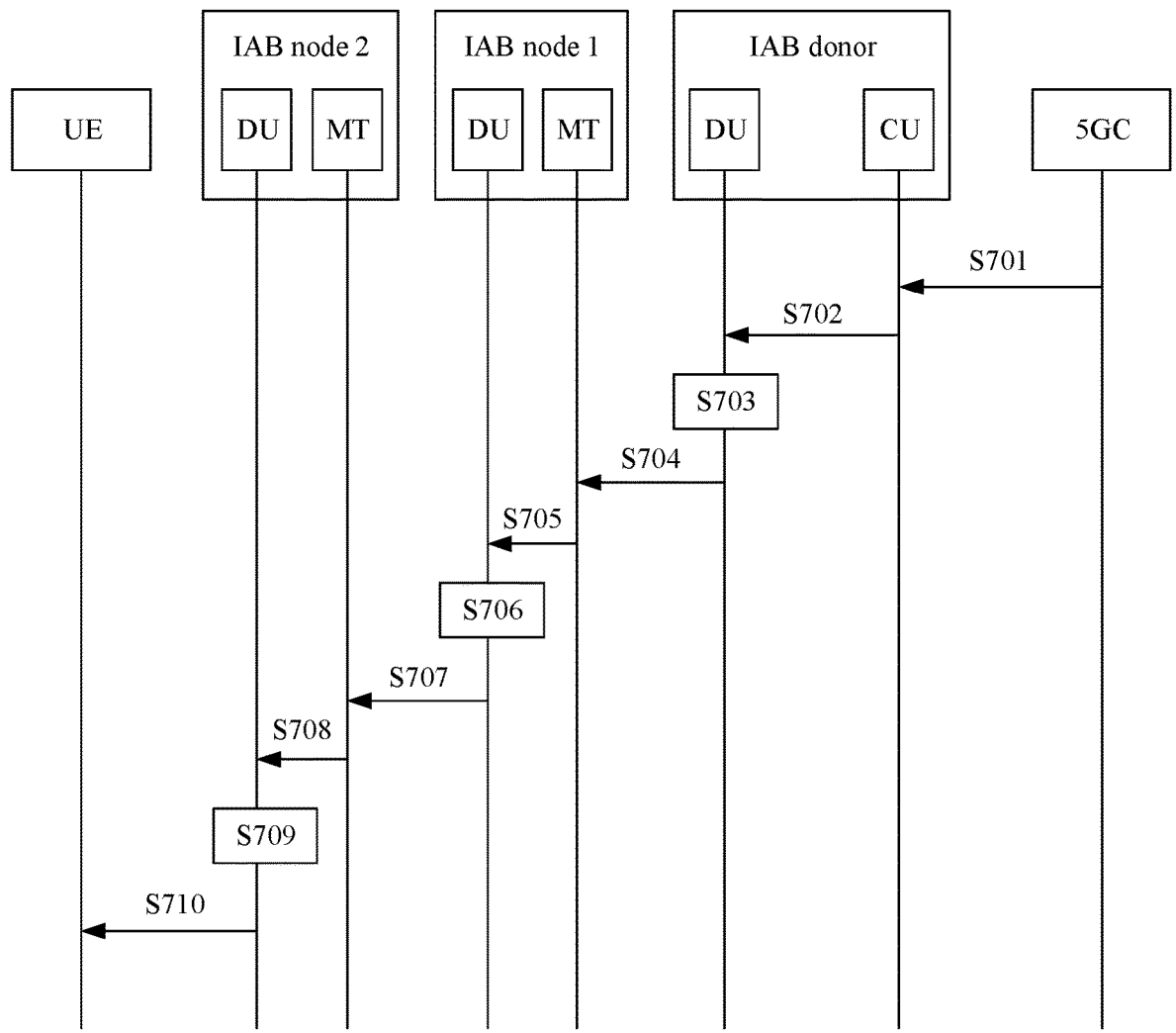
FIG. 7A is a schematic flowchart 1 of a downlink data transmission method in an architecture in FIG. 2B according to an embodiment of this application.

FIG. 7A is a schematic flowchart 1 of a downlink data transmission method in the architecture in FIG. 2B according to an embodiment of this application. Referring to solid lines in FIG. 7A, the downlink data transmission method may include the following steps.

S701: The IAB donor CU receives downlink data from the UE.

S702: The IAB donor CU maps the downlink data to a corresponding GTP tunnel, and sends the downlink data to the IAB donor DU.

S703: The IAB donor DU determines a sixth BH RLC channel identity corresponding to a GTP tunnel identity corresponding to the downlink data, based on a correspondence that is sent by the IAB donor CU and that is between a GTP tunnel identity and a BH RLC channel identity.

Herein, the GTP tunnel identity may be a tunnel endpoint identifier (TEID) of the GTP tunnel.

For example, the GTP tunnel identity TEID corresponding to the downlink data may be a TEID allocated by the IAB donor DU, or a TEID allocated by the IAB donor CU.

S704: The IAB donor DU maps the downlink data to a BH RLC channel corresponding to the sixth BH RLC channel identity, and sends the downlink data to the IAB node 1 MT (namely, a next-hop IAB node).

In addition, the IAB donor DU sends, to the IAB node 1 MT, the GTP tunnel identity that corresponds to the downlink data and that is carried in the adaptation layer.

S705: The IAB node 1 MT sends the downlink data to the IAB node 1 DU through an internal interface, and also sends the GTP tunnel identity corresponding to the downlink data to the IAB node 1 DU through the internal interface.

S706: The IAB node 1 DU determines a seventh BH RLC channel identity corresponding to the GTP tunnel identity corresponding to the downlink data, based on the correspondence that is sent by the IAB donor CU and that is between a GTP tunnel identity and a BH RLC channel identity.

S707: The IAB node 1 DU maps the downlink data to a BH RLC channel corresponding to the seventh BH RLC channel identity, and sends the downlink data to the IAB node 2 MT (namely, a next-hop IAB node).

S708: The IAB node 2 MT sends the downlink data to the IAB node 2 DU through an internal interface, and also sends the GTP tunnel identity corresponding to the downlink data to the IAB node 2 DU through the internal interface.

S709: The IAB node 2 DU determines a third DRB ID/third LCID on the Uu interface corresponding to the downlink data, based on a correspondence that is sent by the IAB donor CU and that is between a BH RLC channel identity on the Un2 interface and a DRB ID/an LCID on the Uu interface.

S710: The IAB node 1 DU maps the downlink data to a DRB corresponding to the third DRB ID or a logical channel corresponding to the third LCID, and sends the downlink data to the UE.

In this embodiment, for example, a BH RLC channel identity may be a logical channel identity LCID corresponding to a BH RLC channel.

Figure 7B:
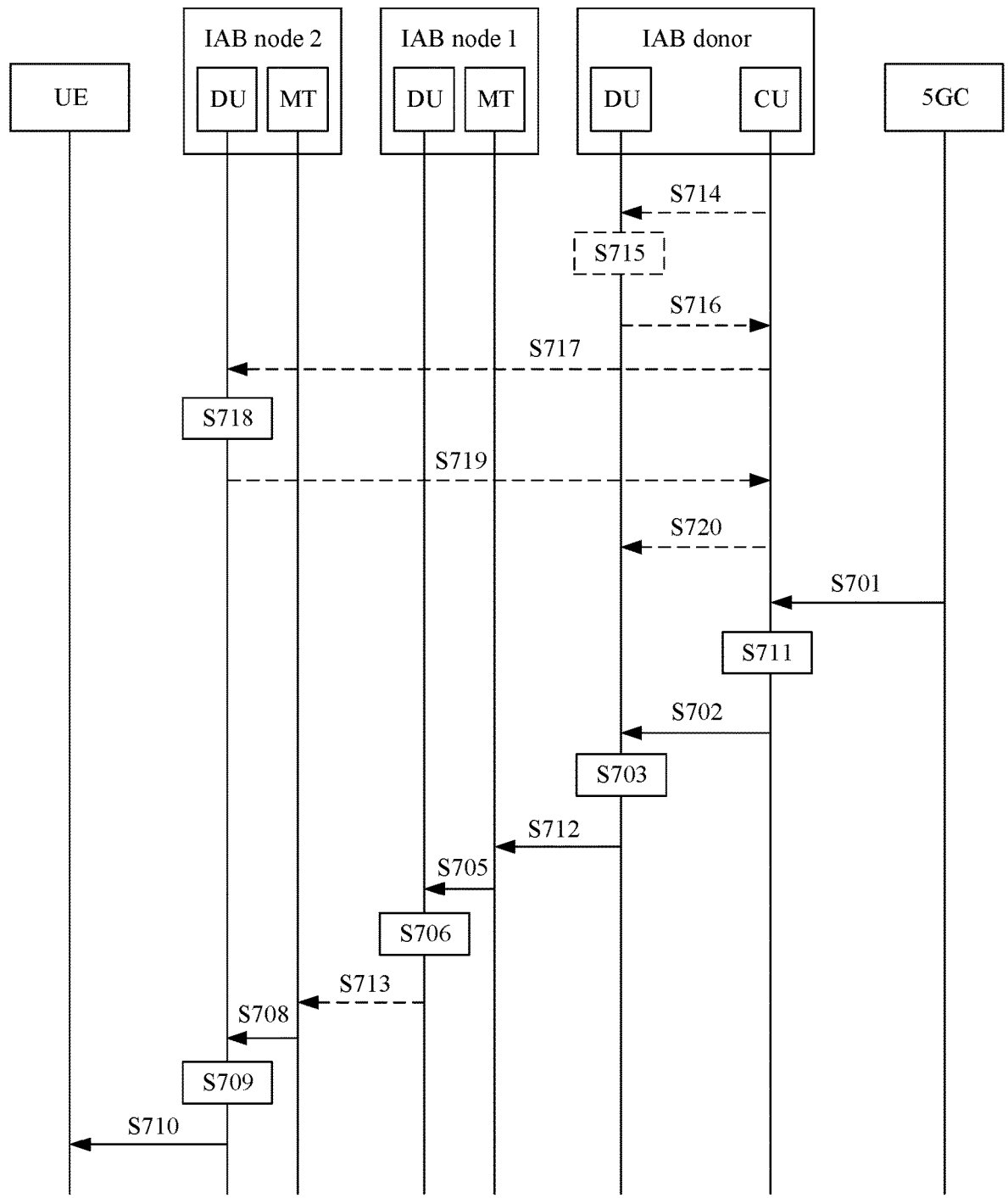
FIG. 7B is a schematic flowchart 2 of a downlink data transmission method in an architecture in FIG. 2B according to an embodiment of this application.

In some possible implementations, FIG. 7B is a schematic flowchart 2 of a downlink data transmission method in an architecture in FIG. 2B according to an embodiment of this application. Referring to FIG. 7B, after S701, the method may further include the following step: S711: An IAB donor DU receives the downlink data from a GTP tunnel, and determines, based on an identity (such as a TEID) of the GTP tunnel, sixth service QoS information corresponding to the downlink data transmitted through the GTP tunnel.

S704 may be replaced by S712: The IAB donor DU maps the downlink data to a BH RLC channel that is on the Un1 interface and that is corresponding to the sixth service QoS information, and sends the downlink data to the IAB node 1 MT (namely, a next-hop IAB node).

In addition, the IAB donor DU sends, to the IAB node 1 MT, the GTP tunnel identity that corresponds to the downlink data and that is carried in the adaptation layer.

The IAB node 1 MT sends the downlink data to the IAB node 1 DU through the internal interface, and also sends the GTP tunnel identity corresponding to the downlink data to the IAB node 1 DU through the internal interface.

Correspondingly, S707 may be replaced by S713: The IAB node 1 DU maps the downlink data to a BH RLC channel that is on the Un2 interface and that is corresponding to the sixth service QoS information, and sends the downlink data to the IAB node 2 MT (namely, a next-hop IAB node).

Before the IAB node 1 DU maps the downlink data to the BH RLC channel that is on the Un2 interface and that is corresponding to the sixth service QoS information, and sends the downlink data to the IAB node 2 MT, the IAB node 1 DU further needs to receive a correspondence that is sent by the IAB donor CU and that is between a GTP tunnel identity and sixth service QoS information.

In this embodiment of this application, in the architecture in FIG. 2B, a bearer mapping solution for uplink data transmission is the same as that for downlink data transmission. The IAB node 2 MT and the IAB node 1 MT perform bearer mapping, and may perform the mapping for the uplink data transmission based on a mapping relationship for the downlink data transmission, or perform the mapping based on a GTP tunnel identity configured by the IAB donor CU and a corresponding BH RLC channel identity, or perform the mapping based on QoS information corresponding to a TEID carried in the adaptation layer.

In this embodiment of this application, before S701, the IAB donor CU needs to indicate the IAB donor DU to enable an F1AP proxy function. In this case, referring to dashed lines in FIG. 7A or FIG. 7B, the foregoing data transmission method may further include the following steps:

S714: The IAB donor CU sends indication information to the IAB donor DU, where the indication information is used to indicate the IAB donor DU to enable the F1 application protocol (F1AP) proxy function.

S715: In response to the indication information, the IAB donor DU allocates corresponding UL F1 TNL information to a service bearer.

S716: The IAB donor DU sends the UL F1 TNL information to the IAB donor CU.

S717: The IAB donor CU sends the UL F1-U TNL information to the IAB node 2 DU.

Specifically, the IAB donor CU sends the indication information to the IAB donor DU, and the IAB donor DU allocates the corresponding UL F1-U TNL information to the service bearer based on the indication information, and sends the UL F1-U TNL information to the IAB node 2 DU through the IAB donor CU, to establish UL GTP-U tunnel between the IAB node 2 DU and the IAB donor DU. For example, the IAB donor DU sends, to the IAB donor CU through an F1AP UE Context Setup Response message, the UL F1-U TNL information allocated by the IAB donor DU. The IAB donor CU sends, to the IAB node 2 DU through an F1AP UE Context Setup Request message, the UL F1-U TNL information allocated by the IAB donor DU. The UL F1-U TNL information includes a GTP-TEID and a TNL address (for example, an IP address of the IAB node 2 DU).

In addition, the data transmission method may further include the following steps: S718: The IAB node 2 DU allocates DL F1 TNL information to a service bearer.

S719: The IAB node 2 DU sends the DL F1 TNL information to the IAB donor CU.

S720: The IAB donor CU sends the DL F1 TNL information to the IAB donor DU.

Specifically, the IAB node 2 DU allocates corresponding DL F1-U TNL information to a UE bearer, and sends the DL F1-U TNL information to the IAB donor DU through the IAB donor CU, to establish DL GTP-U tunnel between the IAB donor DU and the IAB node 2 DU. For example, the IAB node 2 DU sends, to the IAB donor CU through an F1AP UE Context Setup Response message, the DL F1-U TNL information allocated by the IAB node 2 DU. The IAB donor CU sends, to the IAB donor DU through an F1AP UE Context Modification Request message, the DL F1-U TNL information allocated by the IAB node 2 DU.

Embodiment 4

Based on Embodiment 1 to Embodiment 3, an embodiment of this application provides a data transmission method. The method is used in the IAB system shown in FIG. 2B.

It should be noted that, in Embodiment 4, GTP-U tunnel established between the IAB donor CU and the IAB donor DU is per IAB node 1 MT per bearer.

Therefore, compared with the three data transmission methods in the foregoing embodiments, during downlink data bearer mapping, in the data transmission method in this embodiment, the IAB donor CU sends downlink data to the IAB donor DU through a GTP tunnel, and includes a UE bearer ID in a header field of the GTP tunnel, to indicate, to the IAB donor DU, which UE bearer data of which UE is transmitted in the GTP tunnel. The IAB donor DU may perform corresponding bearer mapping based on the correspondence that is sent by the IAB donor CU and that is between a UE bearer ID and a BH RLC channel identity that is on the Un1 interface, or based on the correspondence that is sent by the IAB donor CU and that is between a UE bearer ID and QoS information.

During uplink data bearer mapping, the IAB donor DU receives uplink data from a GTP tunnel that is per UE per bearer, maps the uplink data to a corresponding GTP tunnel, sends the uplink data to the IAB donor CU, and includes the UE bearer ID in a header field of the GTP tunnel, so that the IAB donor CU extracts the uplink data from the GTP tunnel and sends the uplink data to a PDCP layer corresponding to the UE for processing.

Embodiment 5

Based on Embodiment 1 to Embodiment 3, an embodiment of this application provides a data transmission method. The method is used in the IAB system shown in FIG. 2C and FIG. 2B.

It should be noted that in Embodiment 5, GTP-U tunnel established between the IAB donor CU and the IAB donor DU may be per UE per bearer, or may be per IAB node 1 MT per bearer.

If GTP-U tunnel between the IAB donor CU and the IAB donor DU is per UE per bearer, a bearer mapping manner of the IAB system is similar to a bearer mapping manner in Embodiment 3. If the GTP tunnel between the IAB donor CU and the IAB donor DU is per IAB node 1 MT per bearer, a bearer mapping manner of the IAB system is similar to that in Embodiment 4.

It should be noted that the data transmission method in this embodiment of this application may be further used in a single-hop data backhaul scenario. For example, the single-hop data backhaul scenario may include a terminal, an IAB node 1, and an IAB donor. The IAB node 1 functions as an access IAB node. In the foregoing embodiments of this application, the two-hop data backhaul scenario is used as an example, and a protection scope thereof is not limited thereto.

Figure 8:
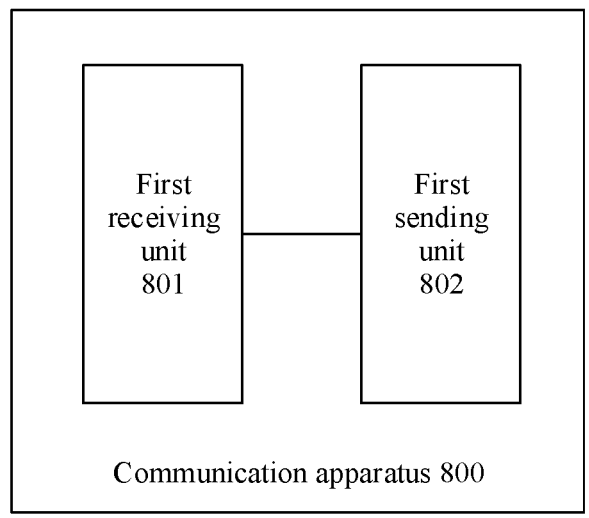
FIG. 8 is a schematic structural diagram 1 of a communication apparatus according to an embodiment of this application.

Based on a same inventive concept as that of the foregoing methods, an embodiment of this application provides a communication apparatus. The communication apparatus may be a data transmission apparatus, or a chip or a system on chip in a data transmission apparatus, or may be a functional module that is in a data transmission apparatus and that is configured to implement the method according to any possible implementation in the foregoing embodiments. The communication apparatus may implement a function performed by the IAB donor DU in the foregoing aspects or possible implementations, and the function may be implemented by hardware executing corresponding software. The hardware or the software includes one or more modules corresponding to the foregoing functions. For example, FIG. 8 is a schematic structural diagram 1 of a communication apparatus according to an embodiment of this application. Referring to FIG. 8, the communication apparatus 800 may include: a first receiving unit 801, configured to receive downlink data and service attribute information of the downlink data that are sent by an integrated access and backhaul IAB donor centralized unit; and a first sending unit 802, configured to: map the downlink data to a corresponding backhaul radio link control BH RLC channel based on the service attribute information of the downlink data or based on the service attribute information of the downlink data and access IAB node address information of the downlink data, and send the downlink data to a next-hop IAB node.

In some possible implementations, the apparatus further includes: a second receiving unit, configured to receive the service attribute information and a BH RLC channel identity that are sent by the IAB donor centralized unit, where the service attribute information corresponds to the BH RLC channel identity. The first sending unit includes a determining subunit and a sending subunit, where the determining subunit is configured to determine, based on the service attribute information and the BH RLC channel identity, a first BH RLC channel identity corresponding to the service attribute information of the downlink data; and the sending subunit is configured to: map the downlink data to a BH RLC channel corresponding to the first BH RLC channel identity, and send the downlink data to the next-hop IAB node.

In some possible implementations, the apparatus further includes: a second sending unit, configured to send a BH RLC channel identity and a logical channel identity to the IAB donor centralized unit, where the BH RLC channel identity corresponds to the logical channel identity, and the BH RLC channel identity and the logical channel identity are used to indicate the IAB donor centralized unit to determine a logical channel allocated by an IAB donor distributed unit to the BH RLC channel.

In some possible implementations, the apparatus further includes: a second receiving unit, configured to receive the service attribute information and service quality of service QoS information that are sent by the IAB donor centralized unit, where the service attribute information corresponds to the service quality of service QoS information. The first sending unit includes a determining subunit and a sending subunit, where the determining subunit is configured to determine, based on the service attribute information and the service QoS information, first service QoS information corresponding to the service attribute information of the downlink data; and the sending subunit is configured to: map the downlink data to a BH RLC channel corresponding to the first service QoS information, and send the downlink data to the next-hop IAB node.

In some possible implementations, the apparatus further includes: a third sending unit, configured to send, to the next-hop IAB node, a service bearer identity of the downlink data or the service attribute information of the downlink data carried in an adaptation layer.

In some possible implementations, the apparatus further includes: a second receiving unit, configured to receive the service attribute information and the service bearer identity that are sent by the IAB donor centralized unit, where the service attribute information corresponds to the service bearer identity. The third sending unit includes a determining subunit and a sending subunit, where the determining subunit is configured to determine, based on the service attribute information and the service bearer identity, a first service bearer identity corresponding to the service attribute information of the downlink data; and the sending subunit is configured to send the first service bearer identity carried in the adaptation layer to the next-hop IAB node.

In some possible implementations, the IAB node includes an IAB node distributed unit and an IAB node mobile terminal unit; and the apparatus further includes: a third receiving unit, configured to receive a service bearer identity of uplink data or service attribute information of uplink data sent by a next-hop IAB node mobile terminal unit, where the service bearer identity of the uplink data or the service attribute information of the uplink data is sent while being carried in the adaptation layer.

In some possible implementations, the apparatus further includes: a fourth receiving unit, a first allocation unit, and a fourth sending unit, where the fourth receiving unit is configured to receive indication information sent by the IAB donor centralized unit, where the indication information is used to indicate the IAB donor distributed unit to enable an F1 application protocol F1AP proxy function; the first allocation unit is configured to: in response to the indication information, allocate corresponding uplink F1 transport network layer UL F1 TNL information to a service bearer; and the fourth sending unit is configured to send the UL F1 TNL information to the IAB donor centralized unit.

In some possible implementations, the apparatus further includes: a fifth receiving unit, configured to receive downlink F1 transport network layer DL F1 TNL information sent by the IAB donor centralized unit, where the DL F1 TNL information is allocated by an access IAB node to the service bearer.

In some possible implementations, the service attribute information of the downlink data is one of the following information: a differentiated services code point DSCP of the downlink data or a flow label of the downlink data; and the service attribute information of the downlink data is encapsulated in an IP layer header field.

The first receiving unit to the fifth receiving unit mentioned in the foregoing embodiment may each be a receiving interface, a receiving circuit, a receiver, or the like. The sending subunit in the first sending unit, and the second sending unit to the fourth sending unit may each be a sending interface, a sending circuit, a transmitter, or the like. The determining subunit in the first sending unit, and the first allocation unit may each be one or more processors.

Figure 9:
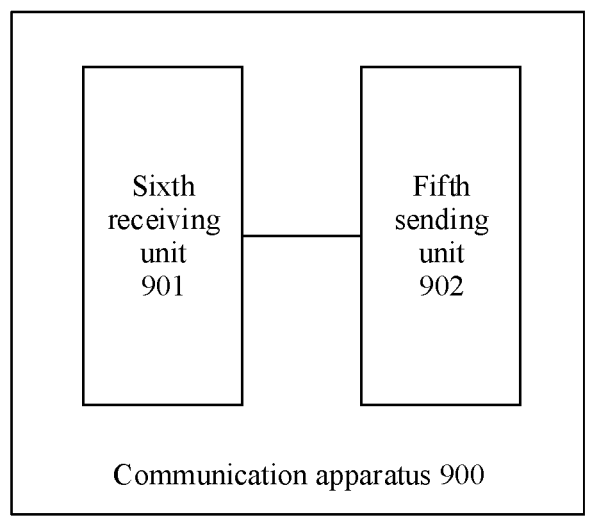
FIG. 9 is a schematic structural diagram 2 of a communication apparatus according to an embodiment of this application.

Based on a same inventive concept as that of the foregoing methods, an embodiment of this application provides a communication apparatus. The communication apparatus may be a data transmission apparatus, or a chip or a system on chip in a data transmission apparatus, or may be a functional module that is in a data transmission apparatus and that is configured to implement a method according to the foregoing embodiments. The communication apparatus may implement a function performed by the IAB node in the foregoing embodiments, and the function may be implemented by hardware executing corresponding software. The hardware or the software includes one or more modules corresponding to the foregoing functions. For example, FIG. 9 is a schematic structural diagram 2 of a communication apparatus according to an embodiment of this application. Referring to FIG. 9, the communication apparatus 900 may include: a sixth receiving unit 901, configured to receive downlink data and at least one of the following information of the downlink data: a backhaul radio link control BH RLC channel identity, a service bearer identity, service attribute information, or service attribute information and access IAB node address information, where the service bearer identity of the downlink data, the service attribute information of the downlink data, and the service attribute information of the downlink data and the access IAB node address information of the downlink data are received from an adaptation layer; and a fifth sending unit 902, configured to: map, based on the at least one of the information, the downlink data to a corresponding BH RLC channel, and send the downlink data.

In some possible implementations, the apparatus further includes: a seventh receiving unit, configured to receive a BH RLC channel identity of a previous-hop backhaul link and a BH RLC channel identity of a next-hop backhaul link, a service bearer identity and a BH RLC channel identity, and/or service attribute information and the BH RLC channel identity that are sent by an IAB donor centralized unit, where the BH RLC channel identity of the previous-hop backhaul link corresponds to the BH RLC channel identity of the next-hop backhaul link, the service bearer identity corresponds to the BH RLC channel identity, and the service attribute information corresponds to the BH RLC channel identity. The fifth sending unit includes a determining subunit and a sending subunit, where the determining subunit is configured to determine, based on the BH RLC channel identity of the previous-hop backhaul link and the BH RLC channel identity of the next-hop backhaul link, the service bearer identity and the BH RLC channel identity, and/or the service attribute information and the BH RLC channel identity, a second BH RLC channel identity corresponding to the at least one of the information of the downlink data; and the sending subunit is configured to: map the downlink data to a BH RLC channel corresponding to the second BH RLC channel identity, and send the downlink data to a next-hop IAB node.

In some possible implementations, the apparatus further includes: a seventh receiving unit, configured to receive the service bearer identity and service quality of service QoS information, the service attribute information and the service QoS information, and/or the BH RLC channel identity and the service QoS information that are sent by the IAB donor centralized unit, where the service bearer identity corresponds to the service QoS information, the service attribute information corresponds to the service QoS information, and the BH RLC channel identity corresponds to the service QoS information. The fifth sending unit includes a determining subunit and a sending subunit, where the determining subunit is configured to determine, based on the service bearer identity and the service QoS information, the service attribute information and the service QoS information, and/or the BH RLC channel identity and the service QoS information, second service QoS information corresponding to the at least one of the information of the downlink data; and the sending subunit is configured to: map the downlink data to a BH RLC channel corresponding to the second service QoS information, and send the downlink data to the next-hop IAB node.

In some possible implementations, the apparatus further includes: a seventh receiving unit, configured to receive the BH RLC channel identity and a data radio bearer identity or a logical channel identity that is on an air interface, the service bearer identity and the data radio bearer identity or the logical channel identity that is on the air interface, and/or the service attribute information and the data radio bearer identity or the logical channel identity that is on the air interface that are sent by the IAB donor centralized unit, where the BH RLC channel identity corresponds to the data radio bearer identity or the logical channel identity that is on the air interface, the service bearer identity corresponds to the data radio bearer identity or the logical channel identity that is on the air interface, and the service attribute information corresponds to the data radio bearer identity or the logical channel identity that is on the air interface. The fifth sending unit includes a determining subunit and a sending subunit, where the determining subunit is configured to determine, based on the BH RLC channel identity and the data radio bearer identity or the logical channel identity, the service bearer identity and the data radio bearer identity or the logical channel identity, and/or the service attribute information and the data radio bearer identity or the logical channel identity, a first data radio bearer identity or a first logical channel identity on the air interface corresponding to the at least one of the information of the downlink data; and the sending subunit is configured to: map the downlink data to a radio bearer corresponding to the first data radio bearer identity or a logical channel corresponding to the first logical channel identity, and send the downlink data to a terminal.

In some possible implementations, the apparatus further includes: a sixth sending unit, configured to send a service bearer identity of uplink data or service attribute information of uplink data to an IAB node distributed unit on a next-hop intermediate backhaul link.

In some possible implementations, the apparatus further includes: a seventh sending unit, configured to: map the uplink data to a BH RLC channel on which the downlink data is received, and send the uplink data, where the uplink data and the downlink data have same service QoS information.

In some possible implementations, the apparatus further includes a second allocation unit and an eighth sending unit, where the second allocation unit is configured to allocate downlink F1 transport network layer DL F1 TNL information to a service bearer; and the eighth sending unit is configured to send the DL F1 TNL information to the IAB donor centralized unit.

The first receiving unit to the seventh receiving unit mentioned in the foregoing embodiment may each be a receiving interface, a receiving circuit, a receiver, or the like. The first sending unit to the eighth sending unit may each be a sending interface, a sending circuit, a transmitter, or the like. The determining subunit may each be one or more processors.

Figure 10:
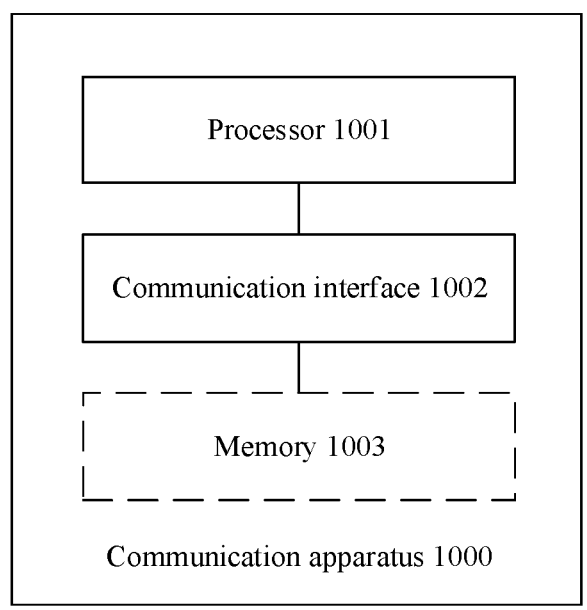
FIG. 10 is a schematic structural diagram 3 of a communication apparatus according to an embodiment of this application.

Based on a same inventive concept as that of the foregoing methods, an embodiment of this application provides a communication apparatus. The communication apparatus may be a chip or a system on chip in an IAB donor DU. The communication apparatus may implement a function performed by the IAB donor DU in the foregoing embodiments. The function may be implemented by hardware. For example, in a possible implementation, FIG. 10 is a schematic structural diagram 3 of a communication apparatus according to an embodiment of this application. Referring to solid lines in FIG. 10, the communication apparatus 1000 may include a processor 1001 and a communication interface 1002. The processor may be configured to support the communication apparatus in implementing a function in the foregoing embodiments. For example, the processor may receive, through the communication interface, downlink data and service attribute information of the downlink data that are sent by an IAB donor CU. The processor is further configured to: map the downlink data to a corresponding BH RLC channel based on the service attribute information of the downlink data, and send the downlink data to a next-hop IAB node. In another possible implementation, referring to a dashed line in FIG. 10, the communication apparatus may further include a memory 1003. The memory is configured to store computer-executable instructions and data that are necessary for the communication apparatus. When the communication apparatus runs, the processor executes the computer-executable instructions stored in the memory, so that the communication apparatus performs a data transmission method according to the foregoing embodiments.

Based on a same inventive concept as that of the foregoing methods, an embodiment of this application provides a communication apparatus. The communication apparatus may be a chip or a system on chip in an IAB node. The communication apparatus may implement a function performed by the IAB node in the foregoing embodiments. The function may be implemented by hardware. For example, in a possible implementation, still referring to solid lines in FIG. 10, the communication apparatus may include a processor and a communication interface. The processor may be configured to support the communication apparatus in implementing a function in the foregoing embodiments. For example, the processor may obtain downlink data and at least one of the following information of the downlink data through the communication interface: a BH RLC channel identity, a service bearer identity, or service attribute information. The processor is further configured to: map the downlink data to a corresponding backhaul radio link control channel BH RLC channel based on the at least one of the information, and send the downlink data. In another possible implementation, referring to a dashed line in FIG. 10, the communication apparatus may further include a memory. The memory is configured to store computer-executable instructions and data that are necessary for the communication apparatus. When the communication apparatus runs, the processor executes the computer-executable instructions stored in the memory, so that the communication apparatus performs a data transmission method according to the foregoing embodiments.

Based on a same inventive concept as that of the foregoing methods, an embodiment of this application provides a computer-readable storage medium. The computer-readable storage medium stores instructions, and when the instructions are run on a computer, the computer is configured to perform any data transmission method in the foregoing embodiments.

Based on a same inventive concept as that of the foregoing methods, an embodiment of this application provides a computer program or a computer program product. When the computer program or the computer program product is executed on a computer, the computer is enabled to implement any data transmission method in the foregoing embodiments.

A person skilled in the art can understand that the functions described with reference to various illustrative logical blocks, modules, and algorithm steps disclosed and described in this specification can be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or may include any communication medium that facilitates transmission of a computer program from one place to another (for example, according to a communication protocol). In this manner, the computer-readable medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the foregoing items should also be included in the scope of the computer-readable media.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may be any one of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize function aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

In the foregoing embodiments, the descriptions in each embodiment have respective focuses. For a part that is not described in detail in an embodiment, refer to related descriptions in other embodiments.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication system, wherein the communication system comprises an integrated access and backhaul donor centralized unit and an integrated access and backhaul donor distributed unit:
   wherein the integrated access and backhaul donor centralized unit is configured to:
   send service attribute information, access integrated access and backhaul node address information, and a backhaul radio link control (BH RLC) channel identity to the integrated access and backhaul donor distributed unit, the service attribute information and the access integrated access and backhaul node address information corresponding to the BH RLC channel identity, wherein the service attribute information is a differentiated services code point (DSCP) or a flow label; and
   send downlink data and service attribute information of the downlink data to the integrated access and backhaul donor distributed unit;
   wherein the integrated access and backhaul donor distributed unit is configured to:
   receive the service attribute information, the access integrated access and backhaul node address information, and the BH RLC channel identity that are from the integrated access and backhaul donor centralized unit;
   receive the downlink data and the service attribute information of the downlink data that are from the integrated access and backhaul donor centralized unit;
   determine, based on a correspondence between the BH RLC channel identity, and the service attribute information and the access integrated access and backhaul node address information, a first BH RLC channel identity, wherein the first BH RLC channel identity corresponds to the service attribute information of the downlink data and access integrated access and backhaul node address information of the downlink data;
   map the downlink data to a BH RLC channel corresponding to the first BH RLC channel identity; and
   send the downlink data to an access integrated access and backhaul node corresponding to the access integrated access and backhaul node address information, wherein the access integrated access and backhaul node is accessed by a terminal.

2. The communication system according to claim 1, wherein the access integrated access and backhaul node address information of the downlink data is extracted from an internet protocol (IP) layer header field of the downlink data.

3. The communication system according to claim 1, wherein:
the service attribute information of the downlink data is encapsulated in an internet protocol (IP) layer header field of the downlink data.

4. The system according to claim 1, wherein the access integrated access and backhaul node address information is an internet protocol (IP) address of an access integrated access and backhaul node.

5. A communication apparatus, comprising:
at least one processor, and
one or more memories coupled to the at least one processor and storing programming instructions for execution by the at least one processor to perform operations comprising:
receiving service attribute information, access integrated access and backhaul node address information, and a backhaul radio link control (BH RLC) channel identity that are from an integrated access and backhaul donor centralized unit, the service attribute information and the access integrated access and backhaul node address information corresponding to the BH RLC channel identity, wherein the service attribute information is a differentiated services code point (DSCP) or a flow label;
receiving downlink data and service attribute information of the downlink data that are from the integrated access and backhaul donor centralized unit;
determining, based on a correspondence between the BH RLC channel identity, and the service attribute information and the access integrated access and backhaul node address information, a first BH RLC channel identity, wherein the first BH RLC channel identity corresponds to the service attribute information of the downlink data and access integrated access and backhaul node address information of the downlink data;
mapping the downlink data to a BH RLC channel corresponding to the first BH RLC channel identity; and
sending the downlink data to an access integrated access and backhaul node corresponding to the access integrated access and backhaul node address information, wherein the access integrated access and backhaul node is accessed by a terminal.

6. The communication apparatus according to claim 5, wherein the operations further comprise:
extracting, from an internet protocol (IP) layer header field of the downlink data, the access integrated access and backhaul node address information of the downlink data.

7. The communication apparatus according to claim 5, wherein:
the service attribute information of the downlink data is encapsulated in an internet protocol (IP) layer header field of the downlink data.

8. The apparatus according to claim 5, wherein the access integrated access and backhaul node address information is an internet protocol (IP) address of an access integrated access and backhaul node.

9. A communication apparatus, comprising:
at least one processor, and
one or more memories coupled to the at least one processor and storing programming instructions for execution by the at least one processor to perform operations comprising:
sending service attribute information, access integrated access and backhaul node address information, and a backhaul radio link control (BH RLC) channel identity to an integrated access and backhaul donor distributed unit, the service attribute information and the access integrated access and backhaul node address information corresponding to the BH RLC channel identity, wherein the service attribute information is a differentiated services code point (DSCP) or a flow label; and
sending downlink data and service attribute information of the downlink data to the integrated access and backhaul donor distributed unit, wherein the integrated access and backhaul donor distributed unit is configured to:
receive the service attribute information, the access integrated access and backhaul node address information, and the BH RLC channel identity;
receive the downlink data and the service attribute information of the downlink data;
determine, based on a correspondence between the BH RLC channel identity, and the service attribute information and the access integrated access and backhaul node address information, a first BH RLC channel identity, wherein the first BH RLC channel identity corresponds to the service attribute information of the downlink data and access integrated access and backhaul node address information of the downlink data;
map the downlink data to a BH RLC channel corresponding to the first BH RLC channel identity; and
send the downlink data to an access integrated access and backhaul node corresponding to the access integrated access and backhaul node address information, wherein the access integrated access and backhaul node is accessed by a terminal.

10. The apparatus according to claim 9, wherein access integrated access and backhaul node address information of the downlink data is encapsulated in an internet protocol (IP) layer header field of the downlink data.

11. The apparatus according to claim 9, wherein the access integrated access and backhaul node address information is an internet protocol (IP) address of an access integrated access and backhaul node.

12. The apparatus according to claim 9, wherein the service attribute information of the downlink data is encapsulated in an internet protocol (IP) layer header field.

13. A communication method, comprising:
receiving service attribute information, access integrated access and backhaul node address information, and a backhaul radio link control (BH RLC) channel identity that are from an integrated access and backhaul donor centralized unit, the service attribute information and the access integrated access and backhaul node address information corresponding to the BH RLC channel identity, wherein the service attribute information is a differentiated services code point (DSCP) or a flow label;
receiving downlink data and service attribute information of the downlink data that are from the integrated access and backhaul donor centralized unit;
determining, based on a correspondence between the BH RLC channel identity, and the service attribute information and the access integrated access and backhaul node address information, a first BH RLC channel identity, wherein the first BH RLC channel identity corresponds to the service attribute information of the downlink data and access integrated access and backhaul node address information of the downlink data;
mapping the downlink data to a BH RLC channel corresponding to the first BH RLC channel identity; and sending the downlink data to an access integrated access and backhaul node corresponding to the access integrated access and backhaul node address information, wherein the access integrated access and backhaul node is accessed by a terminal.

14. The method according to claim 13, wherein the access integrated access and backhaul node address information is an internet protocol (IP) address of an access integrated access and backhaul node.

15. The method according to claim 13, further comprising:
sending, by the integrated access and backhaul donor centralized unit, the service attribute information, the access integrated access and backhaul node address information, and the BH RLC channel identity; and
sending, by the integrated access and backhaul donor centralized unit, the downlink data and the service attribute information of the downlink data.

16. A communication method, comprising:
sending service attribute information, access integrated access and backhaul node address information, and a backhaul radio link control (BH RLC) channel identity to an integrated access and backhaul donor distributed unit, the service attribute information and the access integrated access and backhaul node address information corresponding to the BH RLC channel identity, wherein the service attribute information is a differentiated services code point (DSCP) or a flow label; and
sending downlink data and service attribute information of the downlink data to the integrated access and backhaul donor distributed unit, wherein the integrated access and backhaul donor distributed unit is configured to:
receive the service attribute information, the access integrated access and backhaul node address information, and the BH RLC channel identity;
receive the downlink data and the service attribute information of the downlink data;
determine, based on a correspondence between the BH RLC channel identity, and the service attribute information and the access integrated access and backhaul node address information, a first BH RLC channel identity, wherein the first BH RLC channel identity corresponds to the service attribute information of the downlink data and access integrated access and backhaul node address information of the downlink data;
map the downlink data to a BH RLC channel corresponding to the first BH RLC channel identity; and
send the downlink data to an access integrated access and backhaul node corresponding to the access integrated access and backhaul node address information, wherein the access integrated access and backhaul node is accessed by a terminal.

17. The method according to claim 16, wherein the access integrated access and backhaul node address information is an internet protocol (IP) address of an access integrated access and backhaul node.

* * * * *